(12) United States Patent
Green

(10) Patent No.: US 10,351,410 B2
(45) Date of Patent: Jul. 16, 2019

(54) DISPENSING SYSTEM

(71) Applicant: THE COCA-COLA COMPANY, Atlanta, GA (US)

(72) Inventor: Charles Bradley Green, Dacula, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 0 days.

(21) Appl. No.: 15/306,501

(22) PCT Filed: Apr. 29, 2015

(86) PCT No.: PCT/US2015/028301
§ 371 (c)(1),
(2) Date: Oct. 25, 2016

(87) PCT Pub. No.: WO2015/168290
PCT Pub. Date: Nov. 5, 2015

(65) Prior Publication Data
US 2017/0043992 A1    Feb. 16, 2017

Related U.S. Application Data

(60) Provisional application No. 61/986,405, filed on Apr. 30, 2014.

(51) Int. Cl.
*B67D 1/00* (2006.01)
*B67D 1/12* (2006.01)
(Continued)

(52) U.S. Cl.
CPC ......... *B67D 1/0063* (2013.01); *B67D 1/0036* (2013.01); *B67D 1/0888* (2013.01);
(Continued)

(58) Field of Classification Search
CPC ...... F25D 3/06; F25D 31/002; F25D 31/0002; F25D 2303/0831; F25D 2303/0843;
(Continued)

(56) References Cited

U.S. PATENT DOCUMENTS 4,354,806 A * 10/1982 McMillin .............. B01F 3/0473
417/393
4,517,651 A * 5/1985 Kawasaki ............ B67D 1/0041
222/129.4
(Continued)

FOREIGN PATENT DOCUMENTS

JP    H01-161496 U    11/1989
JP    H09-267896 A    10/1997
(Continued)

OTHER PUBLICATIONS

Desittere, Michiel; European Search Report & Written Opinion; dated Nov. 29, 2017; pp. 1-8; European Patent Office; Munich, Germany.
(Continued)

*Primary Examiner* — Paul R Durand
*Assistant Examiner* — Andrew P Bainbridge

(57) ABSTRACT

A dispenser system for providing variable carbonation can include a carbonated water source in communication with a carbonated water valve for controlling flow of carbonated water through the dispenser system; a still water source in communication with a still water valve for controlling flow of still water through the dispenser system; a nozzle in fluid communication with the carbonated water source and still water source; a processing device adapted to modulate the carbonated water and still water valves within a modulate cycle to achieve a ratio of carbonated to non-carbonated water; and a pour mechanism adapted to provide an input to the processing device to dispense the beverage.

18 Claims, 21 Drawing Sheets

(51) Int. Cl.
  *F25D 31/00* (2006.01)
  *B67D 1/08* (2006.01)
  *F25B 21/02* (2006.01)
  *F25D 3/06* (2006.01)
  *B67D 1/10* (2006.01)

(52) U.S. Cl.
  CPC ......... *B67D 1/1204* (2013.01); *B67D 1/1279* (2013.01); *B67D 1/1284* (2013.01); *F25B 21/02* (2013.01); *F25D 3/06* (2013.01); *F25D 31/002* (2013.01); *B67D 1/10* (2013.01); *B67D 1/12* (2013.01); *B67D 1/1231* (2013.01); *F25B 2321/0251* (2013.01); *F25D 2303/0831* (2013.01); *F25D 2303/0843* (2013.01)

(58) Field of Classification Search
  CPC ............. F25B 21/02; F25B 2312/0251; B67D 1/0063; B67D 1/0036; B67D 1/0888; B67D 1/1204; B67D 1/1279; B67D 1/1284; B67D 1/10; B67D 1/12; B67D 1/1231
  USPC ............... 222/129.1–129.2, 638–642, 145.1, 222/145.5–145.6, 185.1, 504
  See application file for complete search history.

(56) References Cited

U.S. PATENT DOCUMENTS

| | | | | |
|---|---|---|---|---|
| 4,830,511 A * | 5/1989 | Smazik | ................ | B67D 1/0037 222/129.3 |
| 4,890,774 A * | 1/1990 | Poore | ................... | B67D 1/1213 141/102 |
| 4,979,639 A * | 12/1990 | Hoover | ................ | B67D 1/0037 137/625.19 |
| 5,033,645 A * | 7/1991 | Shannon | .............. | B67D 1/0009 222/129.1 |
| 5,064,100 A * | 11/1991 | Mural | ................. | B01F 15/0404 215/10 |
| 6,240,829 B1 * | 6/2001 | McGarrah | ............... | A23F 3/163 222/129.4 |
| 6,685,054 B2 * | 2/2004 | Kameyama | .......... | B67D 1/0037 222/129.3 |
| 6,772,944 B2 * | 8/2004 | Brown | .................... | B67D 7/02 235/376 |
| 7,147,131 B2 * | 12/2006 | Sher | ........................ | A47J 31/41 222/1 |
| 7,156,259 B2 * | 1/2007 | Bethuy | ................ | B67D 1/0032 222/129.2 |
| 8,220,660 B2 * | 7/2012 | Smith | .................. | G05D 11/006 137/101.19 |
| 8,490,829 B2 * | 7/2013 | Deo | ..................... | B67D 1/0027 222/57 |
| 9,051,162 B2 * | 6/2015 | Peters | .................. | B67D 1/0041 |
| 9,415,992 B2 * | 8/2016 | Ryan | ................... | B01F 7/00216 |
| 2002/0113087 A1 * | 8/2002 | Ziesel | ................. | B67D 1/0007 222/129.1 |
| 2006/0288874 A1 * | 12/2006 | Ziesel | ................. | B01F 3/04815 99/279 |
| 2007/0205220 A1 * | 9/2007 | Rudick | ................ | B67D 1/0025 222/129.4 |
| 2007/0205221 A1 * | 9/2007 | Carpenter | ............ | B67D 1/0051 222/129.4 |
| 2011/0260344 A1 | 10/2011 | Shanahan et al. | | |
| 2011/0315711 A1 * | 12/2011 | Hecht | ..................... | A47J 31/52 222/129.1 |
| 2012/0177784 A1 | 7/2012 | Malagi et al. | | |
| 2017/0043992 A1 * | 2/2017 | Green | ................. | B67D 1/0036 |
| 2017/0088410 A1 * | 3/2017 | Wing | .................. | B67D 1/0022 |

FOREIGN PATENT DOCUMENTS

| | | |
|---|---|---|
| JP | 2002358570 A | 12/2002 |
| JP | 2003012091 A | 1/2003 |
| JP | 2005309679 A | 11/2005 |
| WO | 9609111 A1 | 3/1996 |

OTHER PUBLICATIONS

Lee, Jong Kyung; International Search Report & Written Opinion; dated Jul. 30, 2015; pp. 1-13; Korean Intellectual Property Office; Daejeon Metropolitan City, Republic of Korea.
First Office Action; dated Feb. 23, 2018; pp. 1-9; State Intellectual Property Office of China, Beijing, China.
Tomoaki Koiwa; Japanese Office Action; dated Mar. 28, 2019; pp. 1-18; Japanese Patent Office; Tokyo, Japan.

* cited by examiner

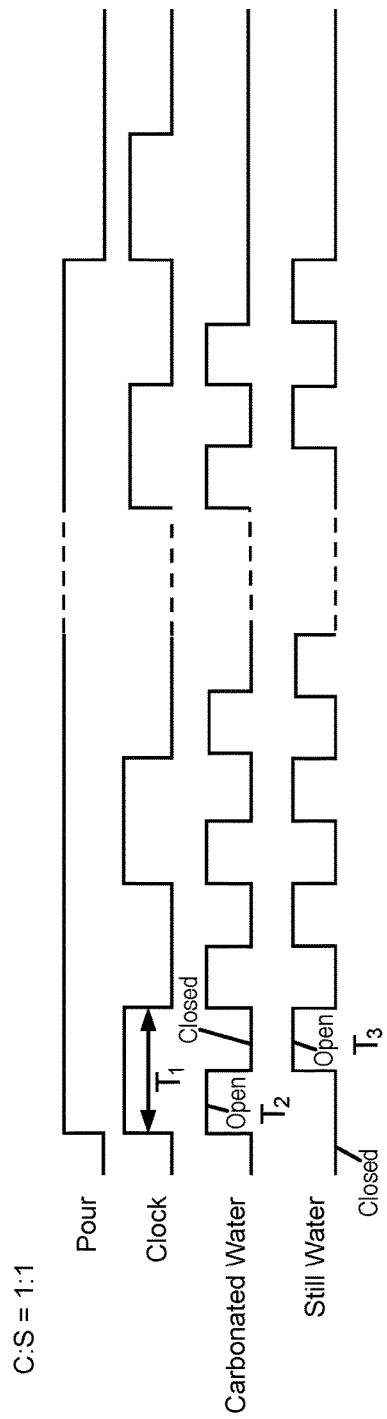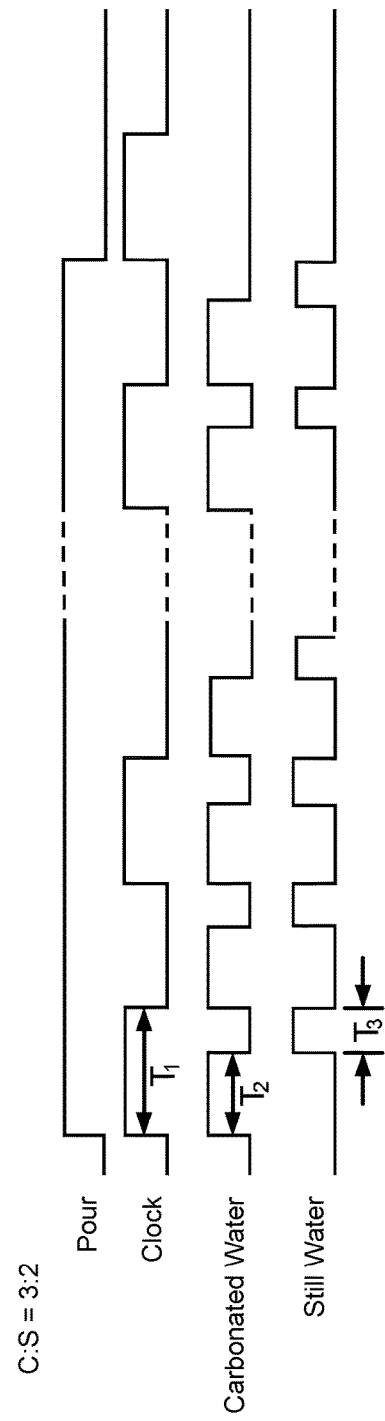

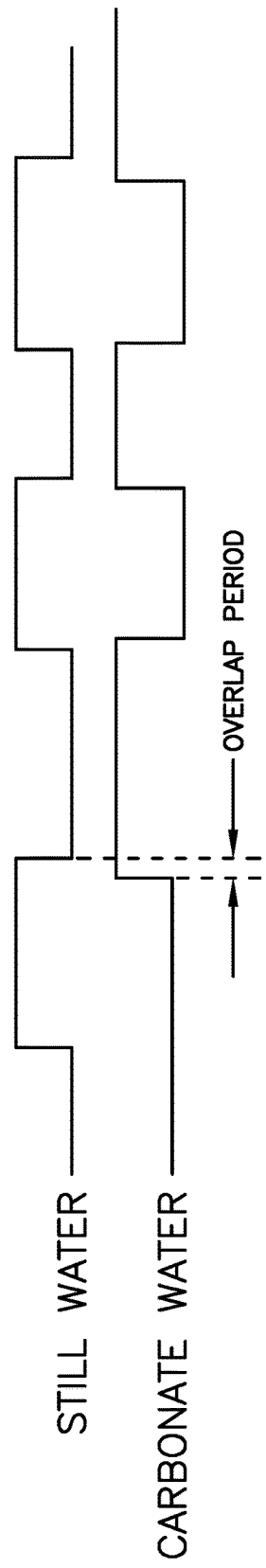

DISPENSING SYSTEM

This application is a U. S. National stage application of PCT/US2015/028301, which was filed on Apr. 29, 2015, as a PCT International Patent application and claims priority to U.S. Provisional patent application No. 61/986,405, filed Apr. 30, 2014, the entire disclosures of which are incorporated by reference in their entirety.

BACKGROUND

Beverage dispensers for soft drinks, sports drinks, waters, and the like, generally include a device for producing carbonated water. A common device for producing and storing carbonated water is a carbonator. Generally described, most carbonators include a pressurized tank, a plain water inlet, a carbon dioxide gas inlet, and a carbonated water outlet. Once the plain water and the carbon dioxide gas mix within the tank, the carbonated water generally remains in the tank until needed for a beverage. The carbonator may be chilled or the carbonated water may be chilled at another location prior to a dispense. Most commercially available beverage dispensers are generally designed for large volume commercial outlets such as restaurants and other types of retail outlets. The beverage dispensers thus must accommodate large volumes of beverages within a small amount of time. Given such, beverage dispenser design has focused generally on maximizing cooling and dispensing speeds. Such beverage dispensers thus may be relatively large, expensive, and generally not intended to be portable. There is thus a desire for a lower volume beverage dispenser for carbonated beverages. Such a beverage dispenser, however, should provide the same quality carbonated beverages as produced by conventional beverage dispensers while being reasonable in terms of size, cost, variety, and ease of operation in terms of dispensing, refilling, maintenance, and the like. Commercially available beverage dispensers for soft drinks, sports drinks, waters, and the like, generally include a device for producing carbonated water. A common device for producing and storing carbonated water is a carbonator. Typically, carbonators include a pressurized tank, a plain water inlet, a carbon dioxide inlet, and a carbonated water outlet. Once the plain water and the carbon dioxide gas mix within the tank, the carbonated water generally remains in the tank until needed for a beverage. The carbonator may receive chilled plain water or the carbonator water may be chilled at another location prior to a dispenser. Typically, commercially available beverage dispensers are designed for large volume commercial outlets, such as restaurants, fast food chains, and other types of food and beverage stores. As a result, the beverage dispensers must accommodate large volumes of beverages within a limited amount of time. Therefore, typical beverage dispenser designs have focused on maximizing cooling and dispensing needs. Such beverage dispensers have been relatively large, expensive, and generally not intended to be portable.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

The present application and the resultant patent thus provide a beverage dispenser for mixing a flow of concentrate, a flow of water, and a flow of gas. The beverage dispenser may include a carbonator with a water input in communication with the flow of water, a gas input in communication with the flow of gas, a carbonated water output, and a chilling reservoir in communication with the flow of water, and a dispensing nozzle in communication with the flow of concentrate and a flow of carbonated water from the carbonated water output of the carbonator. Selecting and dispensing multiple brand beverages at a dispenser apparatus from a dispenser may be provided. A first and second user input indicating a beverage and flavor respectively may be received at a user interface. Where an individual beverage concentrate or flavor has been exhausted a control device may switch to a remaining beverage concentrate or flavor. Furthermore, the control device can output a signal to a user via the user interface. The user interface may indicate a no or low flow condition by highlighting a specific icon associated with the beverage concentrate or flavor, providing a small indication over the specific icon, or other visual indicators in association with a sold-out condition on the user interface. Where the specific beverage concentrate or flavor has been replenished, a sensor may detect a replenished beverage concentrate or flavor. Subsequently, the control device may remove the signal sent to a user via the user interface. The present application and the resultant patent further provide a method of operating a beverage dispenser. The method may include the steps of filling a water/ice reservoir with water and ice, circulating a first flow of water about a carbonator to chill the carbonator, flowing a second flow of water into the carbonator, flowing a flow of gas into the carbonator to produce a flow of carbonated water, flowing the flow of carbonated water to a dispensing nozzle, and flowing a flow of concentrate through a concentrate coil in the carbonator and to the dispensing nozzle. The present application and the resultant patent further provide carbonator for use with a beverage dispenser for mixing a flow of concentrate, a flow of water, and a flow of gas. The carbonator may include a water input in communication with the flow of water, a gas input in communication with the flow of gas, a carbonated water output, a chilling reservoir in communication with the flow of water, and a concentrate coil in communication with the flow of concentrate.

The present application and the resultant patent further provides for a potable water/ice slurry refrigeration system. The potable water/ice slurry refrigeration system may include a water/ice slurry tank, a heat exchanger positioned about the water/ice slurry tank, an ice bin positioned about the water/ice slurry tank, and a grate positioned between the water/ice slurry tank and the ice bin. The present application and the resultant patent further provide a method of chilling a number of fluids in a beverage dispenser. The method may include the steps of positioning an amount of ice in an ice bin, allowing the ice to melt into a water/ice slurry tank, flowing water into the water/ice slurry tank, flowing an ingredient through a heat exchanger positioned about the water/ice slurry tank, flowing water from the water/ice slurry tank to a nozzle, and flowing the ingredient from the heat exchanger to the nozzle to create a beverage.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

The accompanying drawings, which are incorporated in and constitute a part of this disclosure, illustrate various embodiments of the present disclosure. In the drawings:

FIG. 17 is a wave form for controlling signals to vary the carbonated water to still water ratios in the example dispenser system shown in FIG. 16.

FIG. 17A is another example of a wave form for controlling signals to vary the carbonated water to still water ratios.

FIG. 18 is another example of a wave form for controlling signals to vary the carbonated water to still water ratios.

DETAILED DESCRIPTION

Figure 1:
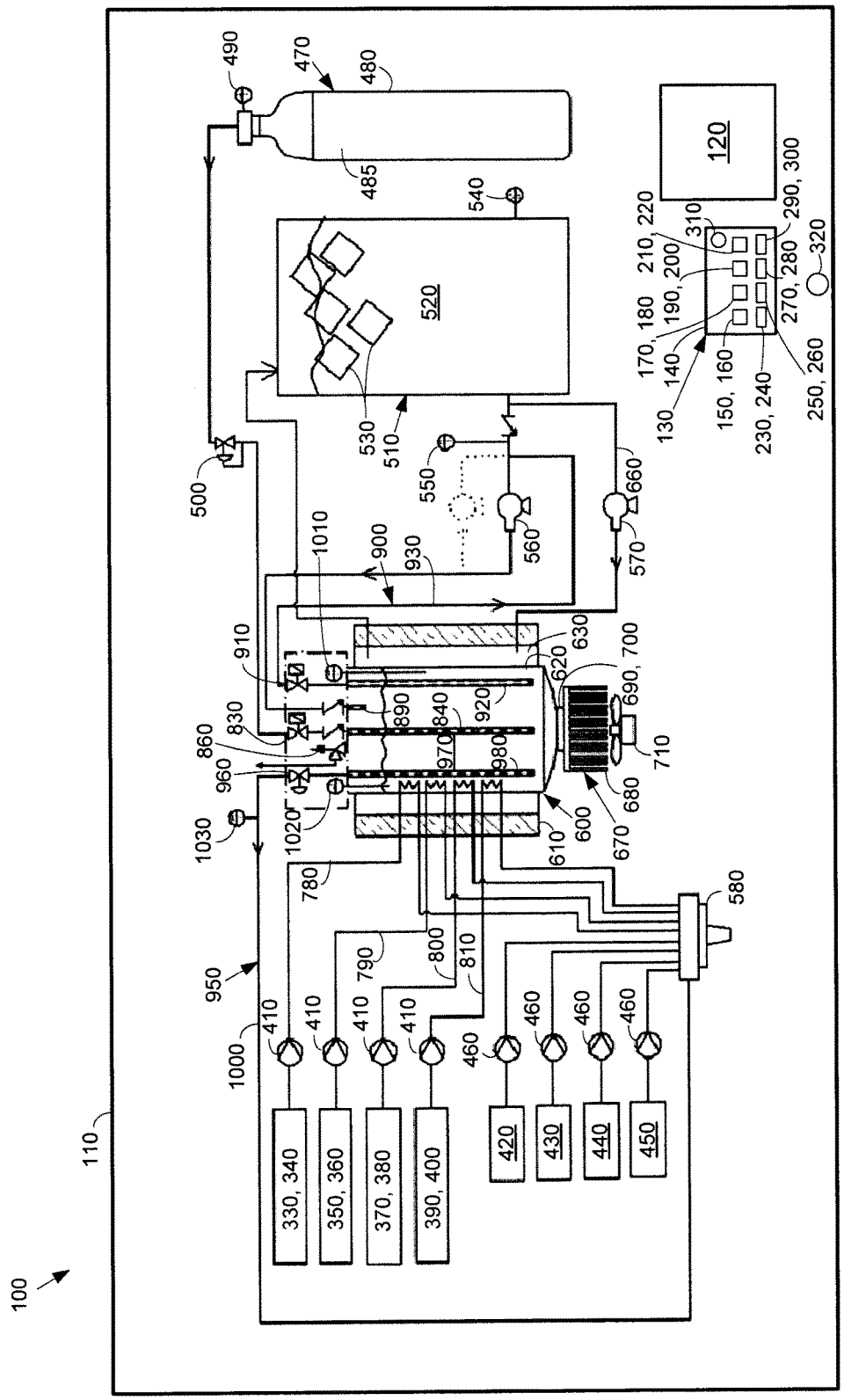
FIG. 1 is a schematic view of a beverage dispenser as may be described herein.
Figure 2:
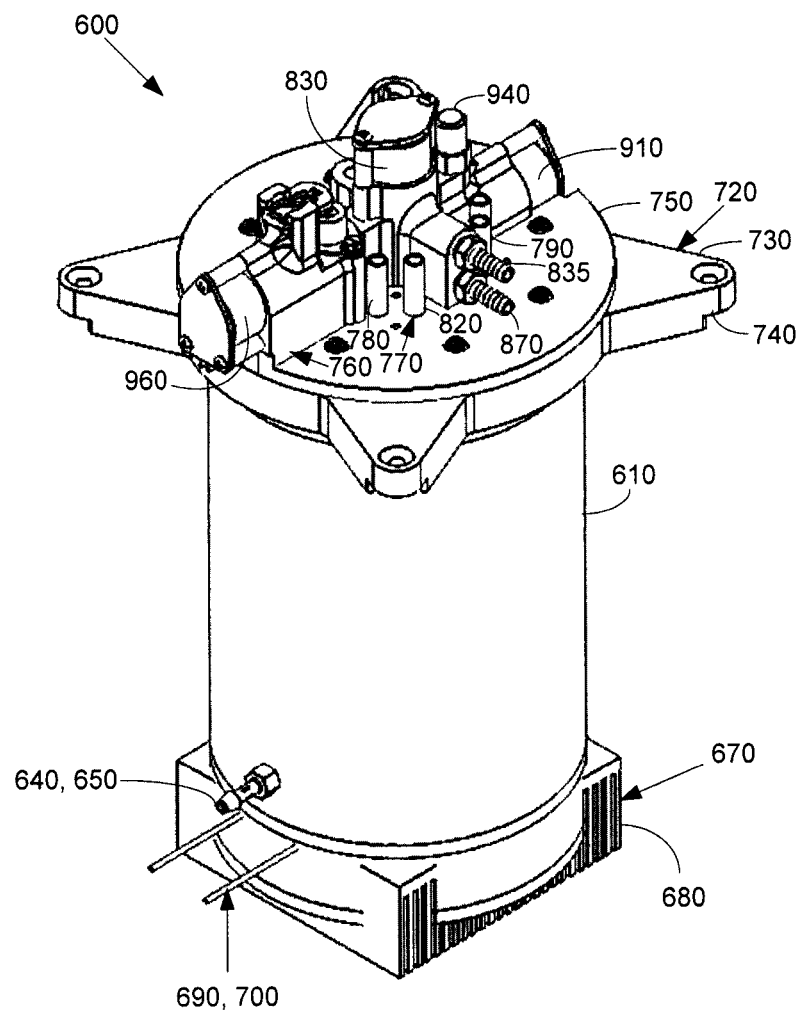
FIG. 2 is a perspective view of a carbonator that may be used with the beverage dispenser of FIG. 1.
Figure 3:
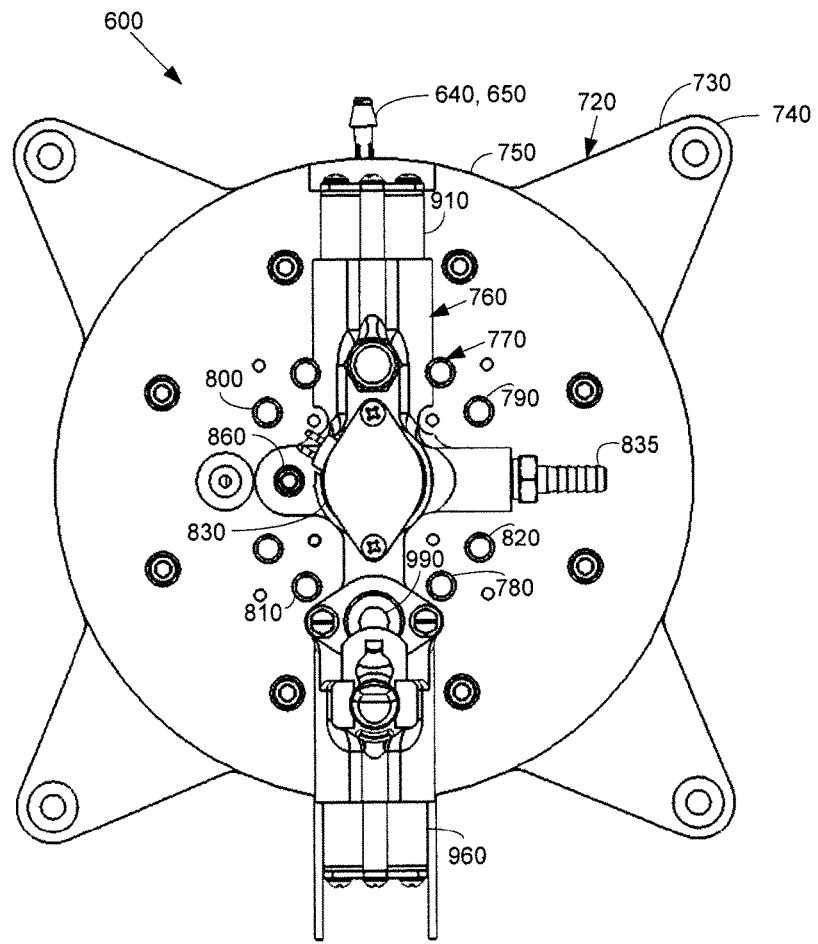
FIG. 3 is a top plan view of the carbonator of FIG. 2.
Figure 4:
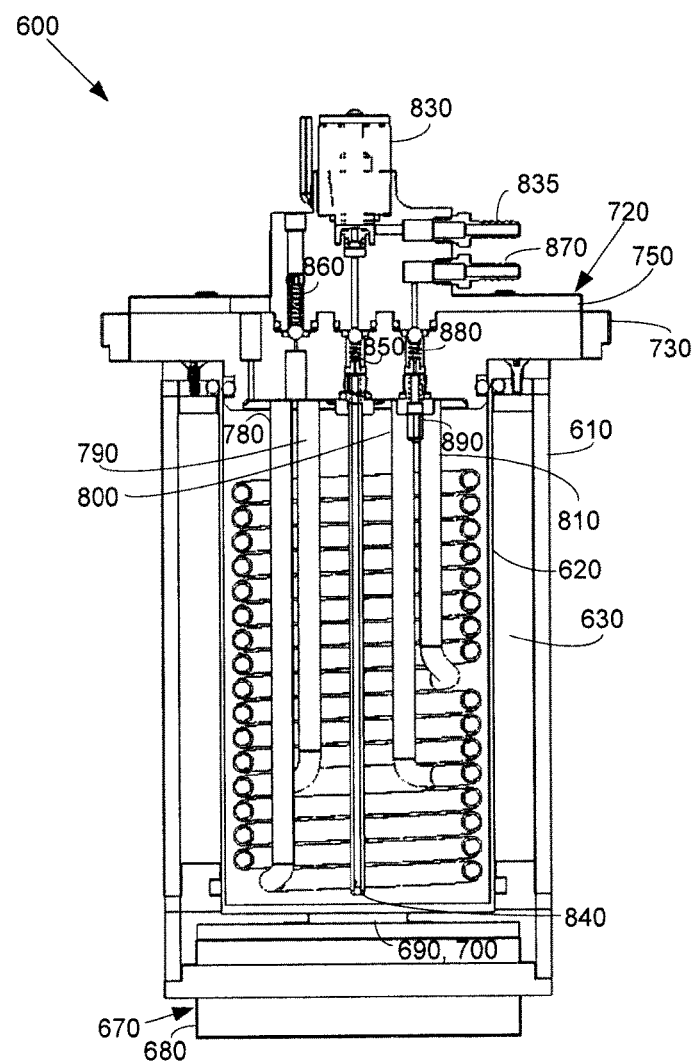
FIG. 4 is a side cross-sectional view of the carbonator of FIG. 2 showing the concentrate coils therein.
Figure 5:
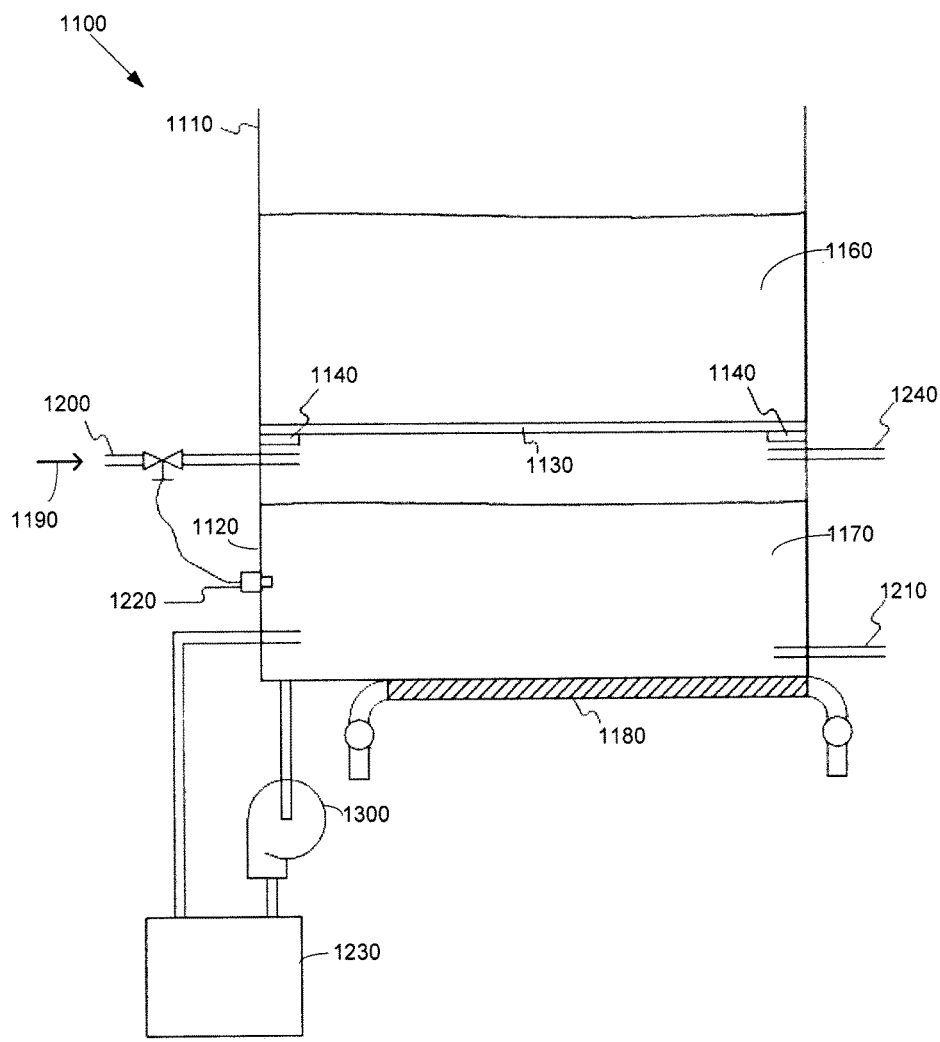
FIG. 5 is a schematic diagram of a potable water/ice slurry refrigeration system as may be described herein.

Referring now to the drawings, in which like numerals refer to like elements throughout the several views, FIG. 1 shows a schematic diagram of an example of a beverage dispenser 100 as may be described herein. The components of the beverage dispenser 100 may be positioned within a housing 110. The housing 110 may be made out of thermoplastics, metal, combinations thereof, and the like. The housing 110 may have any size, shape, or configuration. The beverage dispenser 100 may include a controller 120 for overall operations and communications. The controller 120 may be any type of programmable processing device and the like. The controller 120 may be positioned within the housing 110 or the controller 120 may be external thereof. Multiple controllers 120 also may be used.

A consumer may select a beverage via a consumer input device 130 positioned on the housing 110. In this example, the consumer input device 130 may be a conventional touchscreen 140 or a similar type of device. Alternatively, mechanical devices, electro-mechanical device, audio devices, optical devices, and the like also may be used herein. In this example, the touchscreen 140 may have a number of icons representing a number of beverages and a number of flavors. A first beverage icon 150 may represent a first beverage 160, a second beverage icon 170 may represent a second beverage 180, a third beverage icon 190 may represent a third beverage 200, and a fourth beverage icon 210 may represent a fourth beverage 220. Any number of beverage icons and beverages may be used herein. The touchscreen 140 also may include a number of flavor icons representing a number of flavors. A first flavor icon 230 may represent a first flavor 240, a second flavor icon 250 may represent a second flavor 260, a third flavor icon 270 may represent a third flavor 280, and a fourth flavor icon 290 may represent a fourth flavor 300. Any number of flavor icons and flavors may be used herein.

The touchscreen 140 also may include a pour icon 310. Touching the pour icon 310 may initiate the dispense of a beverage. Alternatively, the beverage dispenser 100 may include a separate pour button 320 positioned elsewhere on the housing 110. The pour button 320 may be an electromechanical device, a further touchscreen, or other type of input device. Pushing the pour button 320 also may initiate the dispense of a beverage. Pressing the pour button 320 may initiate a dispense of a predetermined volume (batch) or the dispense may continue for as long as the pour button 320 is held (continuous). Other types of icons and displays may be available on the touchscreen 140. For example, information concerning price, nutrition, volume, and the like may be available. Any type of information may be displayed herein.

The beverage dispenser 100 also may include a number of beverage cartridges positioned within the housing 110. The beverage cartridges may contain beverage concentrates that relate to the beverages described above. In this example, a first beverage cartridge 330 may include a first beverage concentrate 340, a second beverage cartridge 356 may include a second beverage concentrate 360, a third beverage cartridge 370 may include a third beverage concentrate 380, and a fourth beverage cartridge 390 may include a fourth beverage concentrate 400. Any number of cartridges and beverage concentrates may be used herein. Each of the beverage cartridges may be in communication with a concentrate pump 410. The concentrate pumps 410 may be of conventional design and may be a positive displacement pump and the like. Likewise, the beverage dispenser 100 also may include a number of flavor cartridges with the flavors therein. A first flavor cartridge 420 may have the first flavor 240 therein, a second flavor cartridge 430 may have the second flavor 260 therein, a third flavor cartridge 440 may have the third flavor 280 therein, and a fourth flavor cartridge 450 may have the fourth flavor 300 therein. Any number of flavor cartridges may be used herein. Each of the flavor cartridges may be in communication with a flavor pump 460. The flavor pumps 460 may be of conventional design and may be a positive displacement pump and the like.

The beverage concentrates and flavors may be convention single brand concentrates or flavor concentrates. A number of beverage concentrates and flavors may be available to produce a number of standard core beverages and flavor modifiers. The beverage concentrates and flavors may have varying levels of concentration. Alternatively, the beverage concentrates and/or flavors may be separated in macro-ingredients and micro-ingredients. Generally described, the macro-ingredients may have reconstitution ratios in the range of about 3:1 to about 6:1. The viscosities of the macro-ingredients typically range from about 100 or higher. Macro-ingredients may include sugar syrup, HFCS (High Fructose Corn Syrup), juice concentrates, and similar types of fluids.

The micro-ingredients may have a reconstitution ratio ranging from about ten to one (10:1), twenty to one (20:1), thirty to one (30:1), or higher. Specifically, many micro-ingredients may be in the range of fifty to one (50:1) to three hundred to one (300:1). The viscosities of the micro-ingredients typically range from about 1 to about 100 centipoise or so. Examples of micro-ingredients include natural and artificial flavors; flavor additives; natural and artificial colors; artificial sweeteners (high potency or otherwise); additives for controlling tartness, e.g., citric acid, potassium citrate; functional additives such as vitamins, minerals, herbal extracts; nutraceuticals; and over-the-counter (or otherwise) medicines such as acetaminophen and similar types of materials. The acid and non-acid components of the non-sweetened concentrate also may be separated and stored individually. The micro-ingredients may be liquid, powder (solid), or gaseous form and/or combinations thereof.

The beverage dispenser 100 also may include a carbon dioxide source 470 positioned within the housing 110. The carbon dioxide source 470 may be a carbon dioxide tank 480 and the like. The carbon dioxide tank 480 may have any size, shape, or configuration. Multiple carbon dioxide tanks 480 may be used. An external carbon dioxide source also may be used. A tank sensor 490 may be used to detect the presence of the carbon dioxide tank 480 within the housing 110. The tank sensor 490 may be of conventional design and may be in communication with the controller 120. A pressure regulator 500 may be used with or downstream of the carbon dioxide tank 480. The pressure regulator 500 may be of conventional design.

The beverage dispenser 100 may include a removable water/ice reservoir 510. The water/ice reservoir 510 may have any size, shape, or configuration. The water/ice reservoir 510 is intended for use with a volume of water 520 and/or ice 530. The water/ice reservoir 510 may be in communication with a source of water and/or ice and/or the water/ice reservoir 510 may be refilled manually. The water/ice reservoir 510 may have a level sensor 540, a temperature sensor 550, and the like. The sensors 540, 550 may be of conventional design and may be in communication with the controller 120. A fill pump 560 and a recirculation pump 570 may be in communication with the water/ice reservoir 510 as will be described in more detail below. The pumps 560, 570 may be of conventional design.

The beverage dispenser 100 also may include a dispensing nozzle 580. The dispensing nozzle 580 may mix the streams of beverage concentrate 340, 360, 380, 400; flavors 240, 260, 280, 300; and water 520 so as to create the beverages 160, 180, 200, 220. The dispensing nozzle 580 may be of conventional design. The dispensing nozzle 580 may mix the fluid streams via a target or via air mixing and the like. Other components and other configurations may be used herein.

The beverage dispenser 100 also may include a carbonator 600. The carbonator 600 may be positioned within the housing 110. The carbonator 600 may have any size, shape, or configuration. An example of the carbonator as is described herein is shown in FIGS. 1-4.

The carbonator 600 may include an outer jacket 610. The outer jacket 610 may be partially cylindrical in shape and may have any length or diameter. The outer jacket 610 may be made from an outer layer of an acrylic or similar types of materials and an inner layer of an insulating material with good thermal characteristics. Other types of materials may be used herein.

The carbonator 600 may include a water jacket 620. The water jacket 620 may be positioned within the outer jacket 610 and may define a chilling reservoir 630 therebetween. The water jacket 620 may have any length or diameter. The water jacket 620 may be made out of metals and other types of materials with good thermal characteristics. Likewise, the chilling reservoir 630 may have any length, diameter, or volume. The water jacket 620 may be a pressurized tank for mixing the water 520 and the carbon dioxide 485 therein. The chilling reservoir 630 may surround the water jacket 620. A water input port 640 and a water output port 650 may extend through the outer jacket 610 to the chilling reservoir 630. The chilling reservoir 630 may be in communication with the water/ice reservoir 510 via a recirculation loop 660. The recirculation loop 660 extends from the water/ice reservoir 510 to the water input port 640 via the recirculation pump 570 and then back to the water/ice reservoir 510 via the water output port 650. The recirculation loop 660 thus keeps the water 520 in the chilling reservoir 630 cold so as to chill the water jacket 620 and the internal components thereof. Other components and other configurations may be used herein.

The carbonator 600 may include a heat sink 670 positioned about the water jacket 620. In this example, the heat sink 670 may be a finned heat exchanger 680. Other types of heat exchangers may be used herein. The heat sink 670 may have any size, shape, or configuration. Positioned between the water jacket 620 and the heat sink 670 may be a thermo-electric chilling device 690. The thermo-electric chilling device 690 may be a Peltier device 700 and the like. As is known, a Peltier device creates a heat flux at a junction between two different types of materials via an electric charge. The Peltier device has the advantages of being efficient and largely silent. The Peltier device 700 thus transfers heat from the water jacket 620 to the heat sink 670 so as to cool the water jacket 620 and the internal components thereof. Other types of cooling devices also may be used herein. A fan 710 or other type of air movement device may be positioned about the heat sink 670. Other components and other configurations may be used herein.

The outer jacket 610 and the water jacket 620 of the carbonator 600 may be enclosed by a two-piece cap 720. The two-piece cap 720 may include a lower cap 730. The lower cap 730 may have any size, shape, or configuration. The lower cap 730 may have a number of mounting flanges 740 extending therefrom. The lower cap 730 may be made from any type of substantially rigid thermoplastic materials and the like. The two-piece cap 720 also may include an upper cap 750. The upper cap 750 may have a number of solenoid mounts 760 and passageways 770 formed therein. The upper cap 750 may have any size, shape, or configuration. The upper cap 750 also may be made from any type of substantially rigid thermoplastic material and the like.

The carbonator 600 may include a number of concentrate coils positioned within the water jacket 620 to chill the beverage concentrate therein. The concentrate coils may have any size, shape, or configuration. A first concentrate coil 760 may be in communication with the first beverage cartridge 330 to chill the first beverage concentrate 340, a second concentrate coil 790 may be in communication with the second concentrate cartridge 356 to chill the second beverage concentrate 360, a third concentrate coil 800 may be in communication with the third concentrate cartridge 370 to chill the third beverage concentrate 380, and a fourth concentrate coil 810 may be in communication with the fourth concentrate cartridge 390 to chill the fourth beverage concentrate 400. Any number of concentrate coils may be used herein. The concentrate coils may extend through the two-piece cap 720 or elsewhere in the carbonator 600 via a number of concentrate ports 820 extending through. The beverage concentrates 340, 360, 380, 400 thus may be pumped via the concentrate pumps 410 into the carbonator 600 so as to be chilled within the concentrate coils 780, 790, 800, 810, and then onto the dispensing nozzle 580. Other components and other configurations also may be used herein.

The carbonator 600 may be in communication with the flow of carbon dioxide 485 from the carbon dioxide source 470 via a carbon dioxide solenoid 830. The carbon dioxide solenoid 830 may be of conventional design. Alternatively, any type of flow control device may be used herein. The carbon dioxide solenoid 830 may be mounted on the two-piece cap 720. The carbon dioxide solenoid 830 may be in communication with a stinger tube 840 via a check valve 850. The stinger tube 840 may extend into the water jacket 620 towards a bottom end thereof and may be positioned within the concentrate coils 780, 790, 800, 810. A pressure relief valve 860 may be positioned on the two-piece cap 720 adjacent to the carbon dioxide solenoid 830. The pressure relief valve 860 may be of conventional design. Other components and other configurations may be used herein.

The carbonator 600 also may include a water inlet 870. The water inlet 870 may be in communication with the flow water 520 from the water/ice reservoir 510 via the fill pump 560 or otherwise. The water inlet 870 may extend through the two piece cap 720 into the water jacket 620 via a water check valve 880. The water check valve 880 may be of conventional design. The water inlet 870 may lead to a water nozzle 890 so as to add velocity to the flow of water 520 for increase agitation therein. The water nozzle 890 may have an area of narrowing diameter and the like. Other components and other configurations may be used herein.

The carbonator 600 also may include an agitation bypass system 900. The agitation bypass system 900 may include an agitation bypass solenoid 910. The agitation bypass solenoid 910 may be of conventional design. Alternatively, any type of flow control device may be used herein. The agitation bypass solenoid 910 may be positioned about the two-piece cap 720 and may be in communication with a bypass dip tube 920 extending into the water jacket 620. Water 520 from within the water jacket 620 may be forwarded into a recirculation loop 930. The recirculation loop 930 extends from the bypass dip tube 920, to the agitation bypass solenoid 910, to the recirculation pump 570, and back through the water inlet 870. The recirculation loop 930 may serve to provide agitation to the water stream 520 so as to increase the level of carbonation absorption therein. The agitation bypass solenoid 910 also may assist in self-purging the carbonator 600 upon initial use. A carbon dioxide vent muffler 940 may be positioned about the recirculation loop 930. The carbon dioxide vent muffler 940 may be of conventional design. Other components and other configurations may be used herein.

The carbonator 600 also may include a carbonated water outlet system 950. The carbonated water outlet system 950 may include a carbonated water solenoid 960. The carbonated water solenoid 960 may be of conventional design. Alternatively, any type of flow control device may be used herein. The carbonated water solenoid 960 may be positioned about the two-piece cap 720. The carbonated water solenoid 960 may be in communication with a flow of carbonated water 970 from within the water jacket 620 via a water dip tube 980. The water dip tube 980 extends into the water jacket 620 near a bottom end thereof. An output check valve 990 may be used. The output check valve 990 may be of conventional design. The carbonated water output system 950 may be in communication with the dispensing nozzle 580 via a carbonated water line 1000. Other components and other configurations may be used herein.

The carbonator 600 also may include a temperature sensor 1010, a level sensor 1020, and other types of sensors. A flow meter 1030 may be used on the carbonated water line 1000 and elsewhere. The sensors 1010, 1020 and the flow meter 1030 may be of conventional design. The sensors 1010, 1020 and the flow meter 1030 may be in communication with the controller 1020. Other components and other configurations may be used herein.

In use, the beverage cartridges 330, 350, 370, 390 and the flavor cartridges 420, 430, 440, 450 may be positioned within the housing 110. The water/ice reservoir 510 may be filled with water 520 and/or ice 530 and positioned within the housing 110. Likewise, the carbon dioxide source 470 may be positioned within the housing 110. The fill pump 560 may fill the water jacket 620 of the carbonator 600 with water while the recirculation pump 570 starts to circulate water 520 through the chilling reservoir 630 via the recirculation loop 660. The agitation bypass system 900 may be used so as to increase the carbonation level of the carbonated water 970 within the water jacket 620. Likewise, the carbonator 600 and the carbonated water 970 therein may be further chilled via the thermoelectric cooler 690. Once the carbonated water 970 within the water jacket 620 of the carbonator 600 has reached a predetermined temperature, the beverage dispenser 100 may allow a consumer to select a beverage via the touchscreen 140 of the consumer input device 130. The consumer may select one of the beverages 160, 180, 200, 220 via one of the beverage icons 160, 180, 200, 220 and/or one of the flavors 240, 260, 280, 300 via the flavor icons 230, 250, 270, 290. Once the appropriate beverage is selected, the consumer may press the pour icon 310 or the pour icon 320. The controller 120 then may activate the appropriate concentrate pump 410 so as to pump the beverage appropriate concentrate 340, 360, 380, 400 from the appropriate concentrate cartridge 330, 350, 370, 390 into the appropriate concentrate coil 780, 790, 800, 810 so as to chill the concentrate therein. Likewise, the controller 120 may activate the carbonated water solenoid of the carbonated water outlet system 950 so as to forward a flow of carbonated water 970 at the appropriate flow rate. The beverage concentrate and the carbonated water then may mix within or downstream of the dispensing nozzle 580. More than one concentrate 340, 360, 380, 400 and/or more than one flavor 240, 260, 280, 300 may be used herein to create a single beverage. The fill pump 560 may refill the water jacket 620 with water 520 from the water/ice reservoir 510 when appropriate so as to ensure a predetermined volume of carbonated water 970 therein. Other components and other configurations may be used herein.

The beverage dispenser 100 described herein thus provides quality carbonated beverages and the like without the use of bulking and noisy refrigeration systems. Rather, cooling is provided via the water/ice reservoir 510 and the thermoelectric cooler 690. The consumer merely needs to keep the water/ice reservoir 510 full of an adequate supply of water 520 and/or ice 530. Likewise, the carbonator 600 includes all of the components required to provide carbonated water 970 within a single integrated module as opposed to the several components usually required. The use of the carbonator 600 thus provides a significant size reduction as well as associated cost reductions. The beverage dispenser 100 may be portable and may be available for use on a conventional countertop, tabletop, and the like. Moreover, the carbonator 600 may quickly cool down to the appropriate temperature and maintain that temperature during typical use. The flow of carbonated water 970 also may be used to sanitize the cartridges, the coils, the lines, and the like.

FIG. 5 through FIG. 11 shows an example of a potable water/ice slurry refrigeration system 1100 as may be described herein. The potable water/ice slurry refrigeration system 1100 may include an ice bin 1110 separated from a slurry tank 1120 by a grate 1130. The ice bin 1110 may have two ledges 1140 that the grate 1130 may rest thereon. Other types of support structures may be used herein. The grate 1130 may be manufactured from stainless steel, plastics, or other types of food safe materials. The grate 1130 may have spacings 1150 that retain ice cubes 1160 over a specific size. For example, the grate 1130 may have spacings 1150 that will allow ⅜ inch (9.525 millimeter) ice cubes to pass through, but not 1 12 inch (12.7 millimeter) ice cubes. In addition, the grate spacings 1150 may be uniform or may vary. For instance, certain areas of the grate 1130 may allow ice cubes of ⅜ inch in size to pass through, but not 1 12 inch in size. Other areas of the grate 1130 may allow ice cubes of 1 12 inch in size to pass through, but not ⅝ inch (15.875 millimeters) in size. The varying grate spacings 1150 may allow for a more heterogeneous mixture in the slurry tank 1120.

The slurry tank 1120 includes a water/ice slurry 1170 therein. The water/ice slurry 1170 may cool a flow of the macro-ingredients such as a concentrate or a sweetener or other types of ingredients. Specifically, the macro-ingredients may pass through a micro-channel heat exchanger 1180. The micro-channel heat exchanger 1180 may be braised to the undersurface of the slurry tank 1120 or may be otherwise attached or positioned. The micro-channel heat exchangers 1180 may be sized accordingly to the planned operating capacity of the overall dispenser. For example, dispensers with an expected high throughput may be larger to allow for greater cooling capacity. Dispensers with an expected low throughput may have smaller micro-channel heat exchangers 1180 that may achieve the desired cooling while the ingredients are resting within the micro-channel heat exchanger 1180 between dispensing. The micro-channel heat exchangers 1180 described herein may be constructed in a variety of fashions. For example, the micro-channel heat exchanger 1180 may be extruded. The micro-channel heat exchangers 1180 also may be manufactured via a stacked plate construction method. Other types of manufacturing techniques may be used herein.

During operation, a flow of water 1190 may enter the slurry tank 1120 via a water inlet 1200. This water 1190 may mix with the ice 1160 passing through the grate 1130 to form the water/ice slurry 1170. As the chilled water 1190 is need, the water 1190 may exit the slurry tank 1120 via a water outlet 1210 and head to a carbonator or a dispensing nozzle. The slurry tank 1120 may include a low level sensor 1220 that controls the flow of water 1190 into the slurry tank 1120. In addition, the slurry tank 1120 may include an agitator that may be used to break up ice bridges that may form as the ice melts. A sanitizer 1230, UV or filtration, may be connected to the slurry tank 1120 and allow the water 1190 to be sanitized. Other types of sanitation techniques may be used herein. An overflow line 1240 also may be used herein. Other components and other configurations may be used herein.

Figure 6:
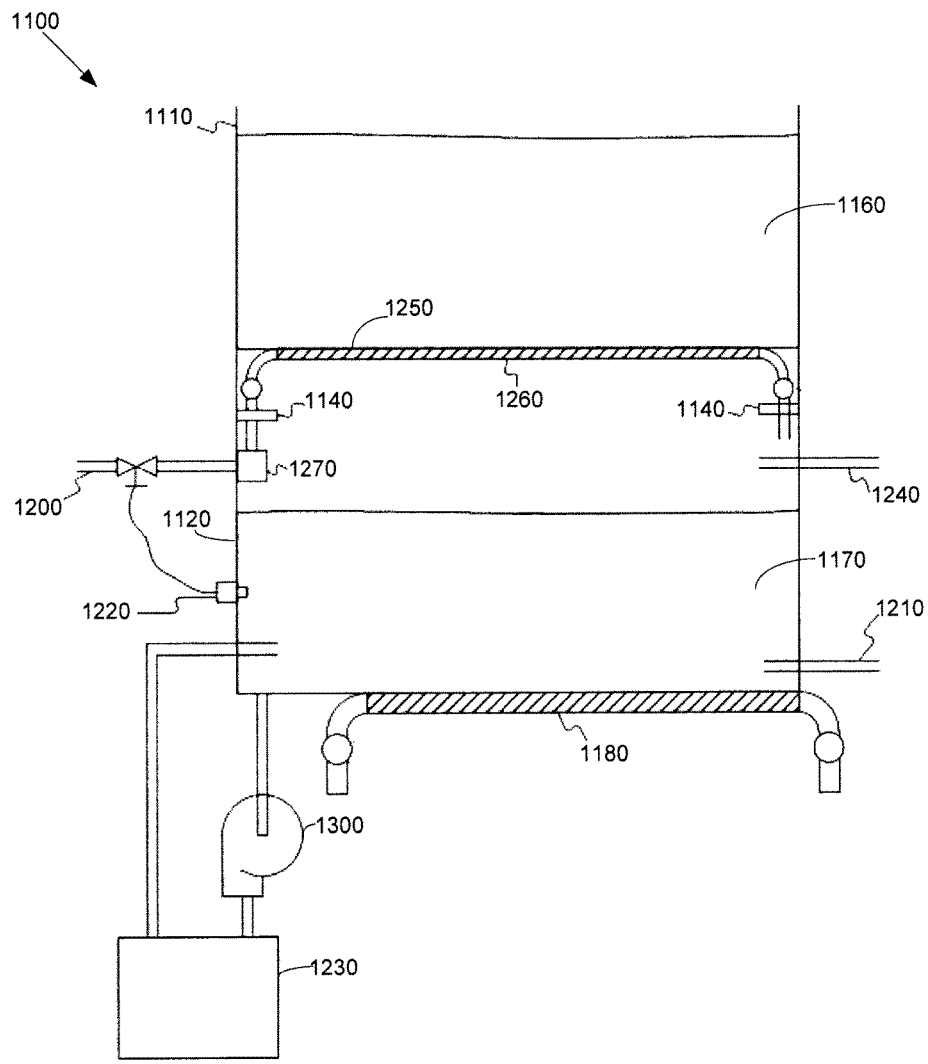
FIG. 6 is a schematic diagram of an alternative embodiment of a potable water/ice slurry refrigeration system as may be described herein.
Figure 7:
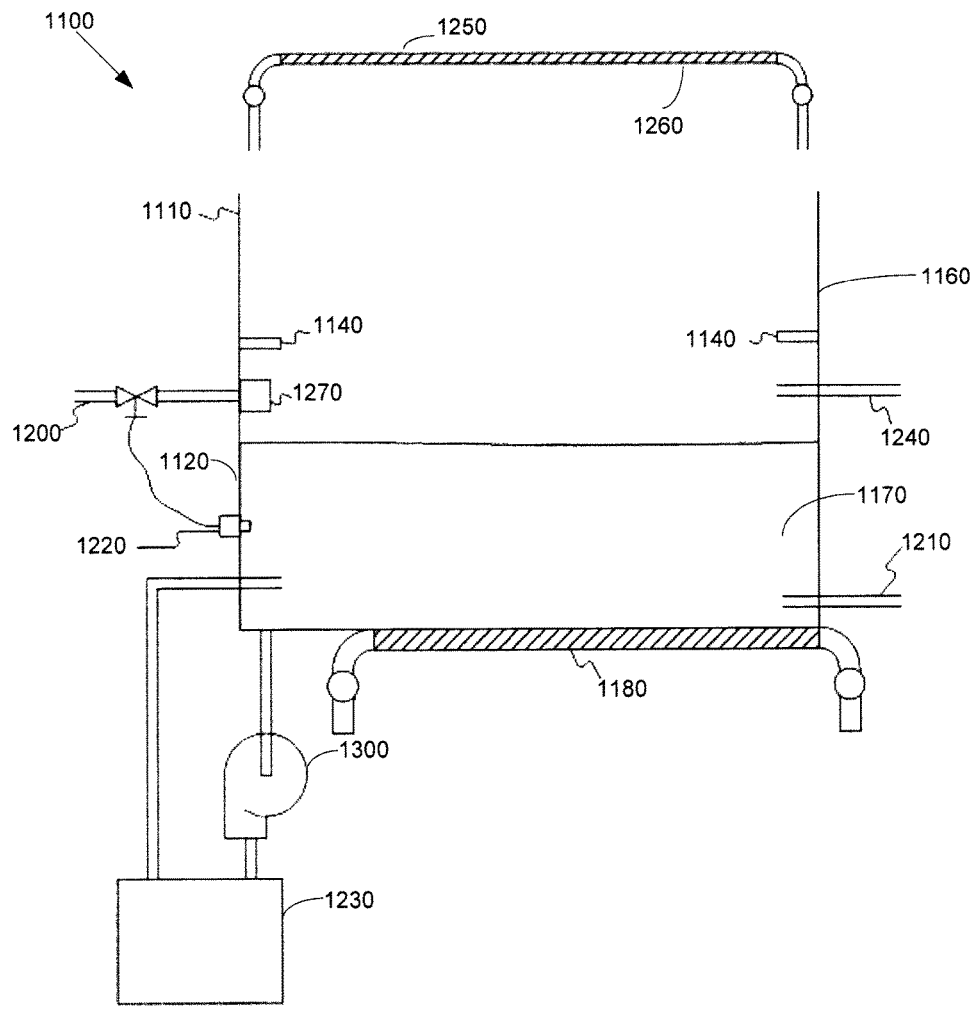
FIG. 7 is a schematic diagram of an alternative embodiment of a potable water/ice slurry refrigeration system as may be described herein.

FIG. 6 and FIG. 7 show a grate 1250 that may be formed of a series of tubing 1260. The tubing 1260 may allow the grate 1250 to act as a pre-chiller for the water 1190. For example, instead of the water 1290 flowing directly into the slurry tank 1020, the water 1190 may first flow through the tubing 1260 of the grate 1250 for chilling. This pre-chilling also may allow heat to flow from the water 1190 to the ice to break up the ice bridges that may form as the ice melts. Furthermore, instead of the tubing 1260, the micro-channel heat exchangers 1180 also may be used to form the grate 1250. Other components and other configurations may be used herein.

Figure 8:
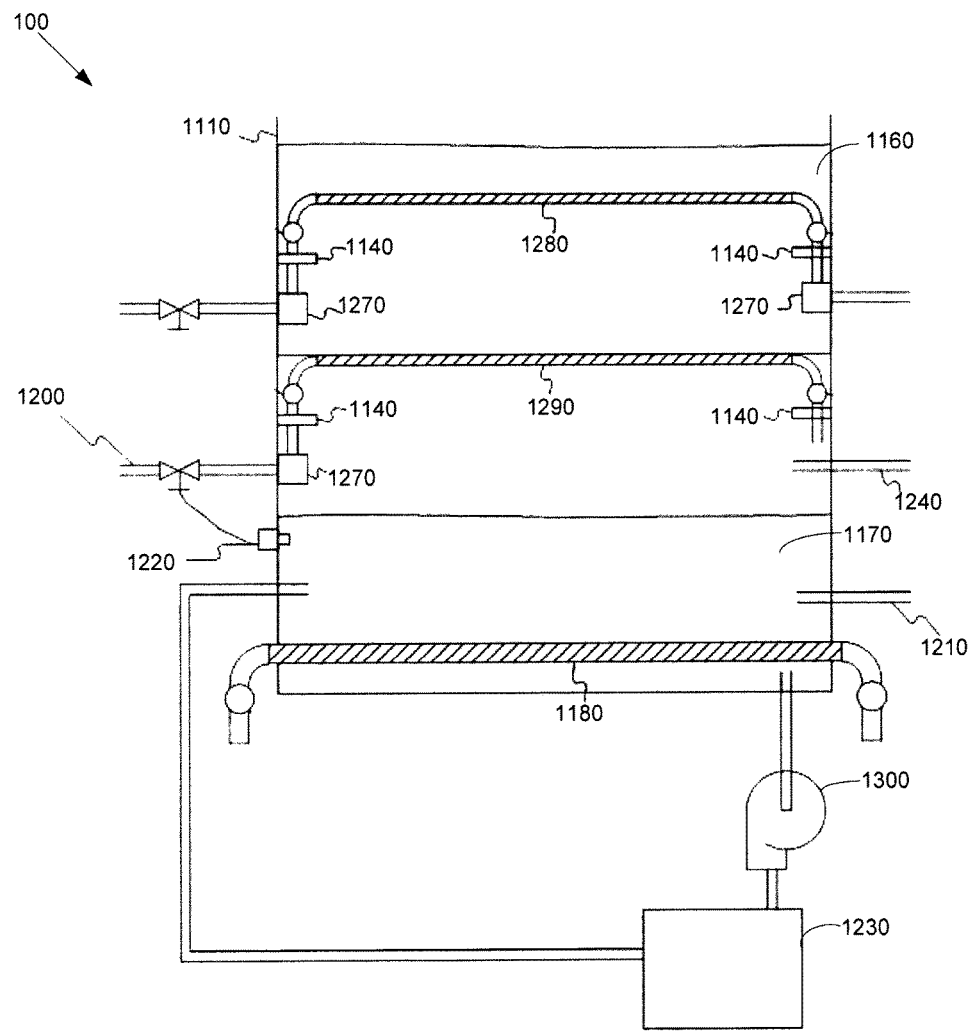
FIG. 8 is a schematic diagram of an alternative embodiment of a potable water/ice slurry refrigeration system as may be described herein.

The grate 1250 may be connected to the incoming water inlet 1200 via a quick disconnect fitting 1270. The quick disconnect fitting 1270 may act as a valve to stop the flow of water 1190 when the grate 1250 is disconnected. Also, an external shut off valve (not shown) also may be used. As shown in FIG. 7, the grate 1250 may be removable to allow a user greater access to the slurry tank 1120 for cleaning. In addition to pre-chilling the incoming water 1190, the grate 1250 also may include sections that allow for the ingredients to flow therethrough for pre-chilling. Furthermore, instead of one grate 1250 divided into sections, multiple grates 1250 may be used. The multiple grates 1250 may be positioned in the same plane or the grates 1250 may be layered. For instance, as shown in FIG. 8, the inlet water 1190 may pass through a bottom grate 1280 and the ingredients may pass thought an upper grate 1290. Each of the grates may have differently sized spacings 1150 to allow progressively smaller sized ice cubes to reach the water/ice slurry 1170. Other components and other configurations also may be used herein.

Figure 9:
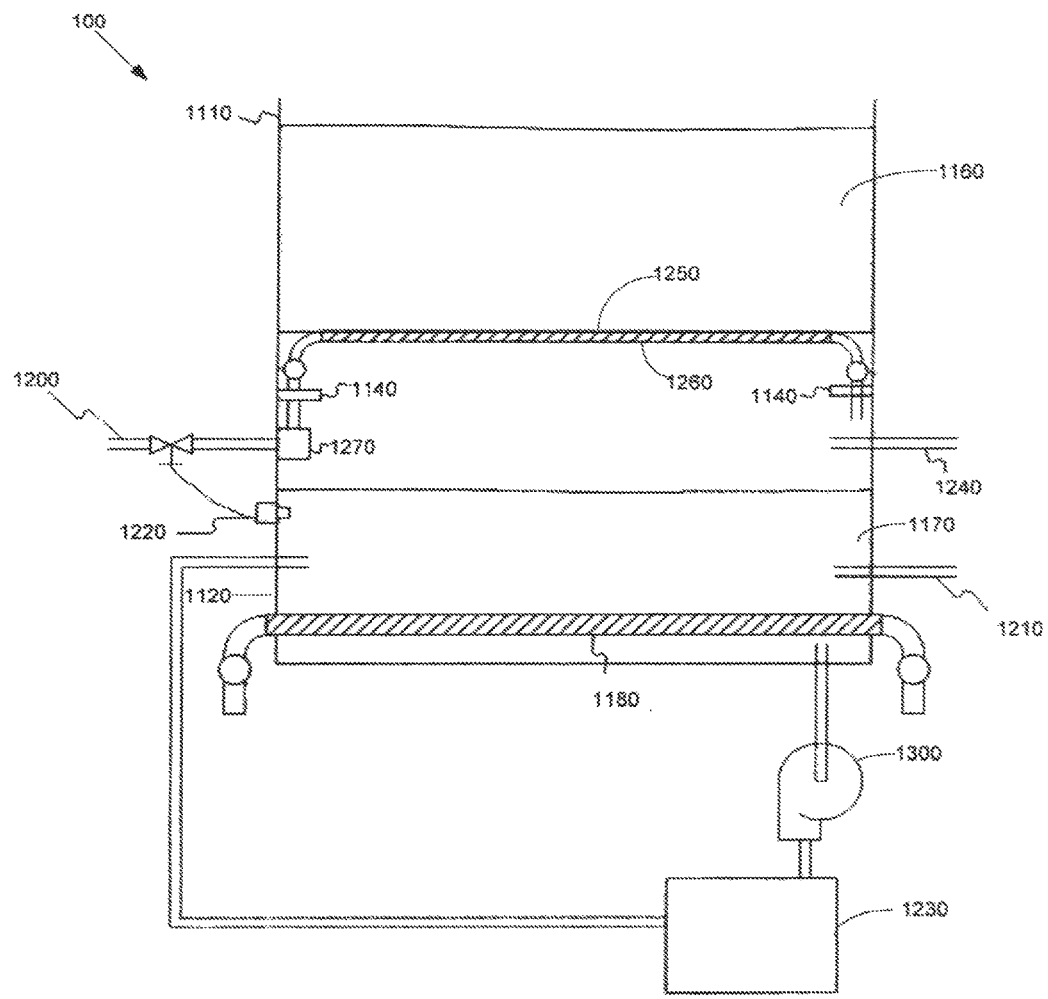
FIG. 9 is a schematic diagram of an alternative embodiment of a potable water/ice slurry refrigeration system as may be described herein.

FIG. 9 shows the slurry tank 1120 with the micro-channel heat exchanger 1180 positioned within the water/ice slurry 1170. In this example, a pump 1300 used to sanitize the water 1190 also may act as a recirculation pump that may allow the water 1190 to cool the micro-channel heat exchanger 1180 via forced convection. As above, the grate(s) may be used as pre-chillers and/or the grates may be removable for easy cleaning.

Figure 10:
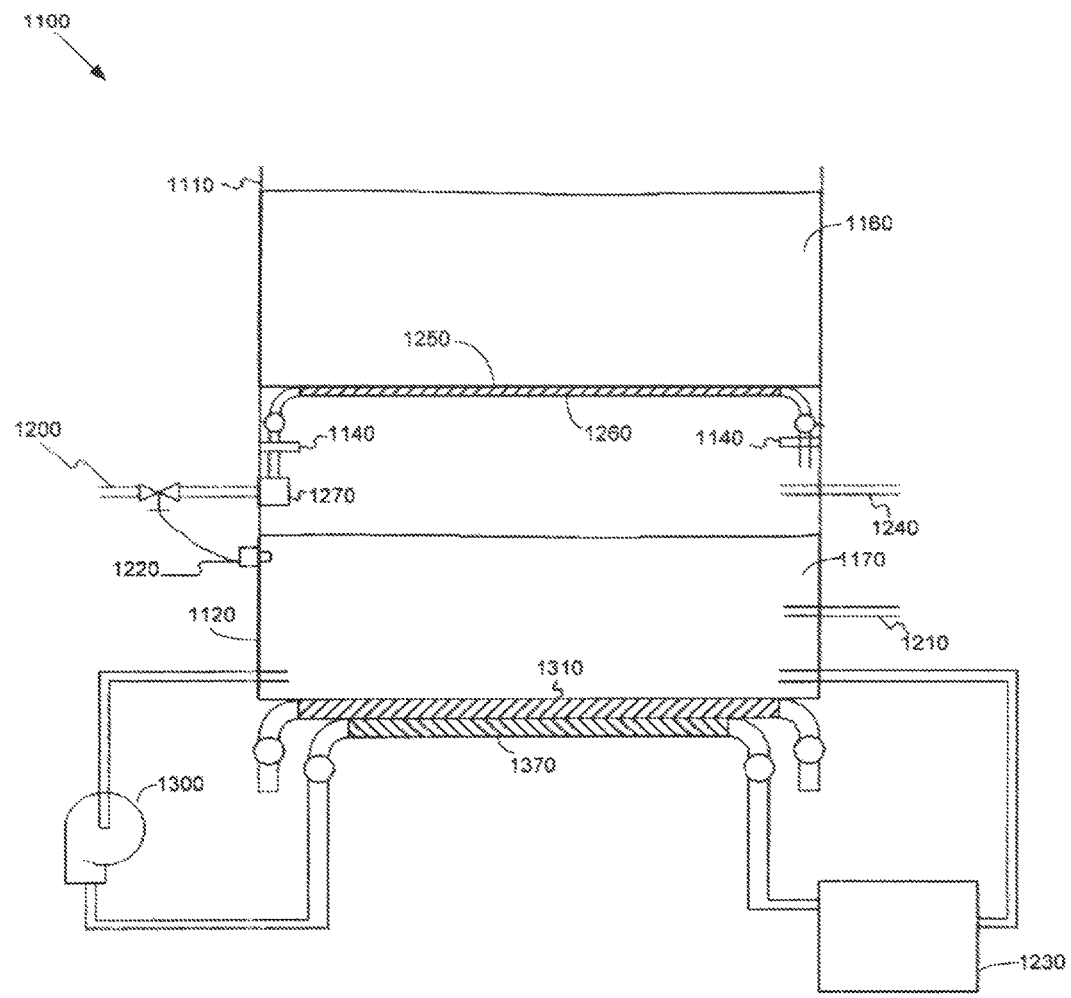
FIG. 10 is a schematic diagram of grate that may be used with the potable water/ice slurry refrigeration systems described above.

FIG. 10 shows the slurry tank 1120 with a first micro-channel heat exchanger 1310 attached thereto. The ingredients may flow through the first micro-channel heat exchanger 1310 to be cooled prior to delivery to a nozzle. In addition, a second micro-channel heat exchanger 1320 may be connected to the first micro-channel heat exchanger 1310. In other words, the first micro-channel heat exchanger 1310 may be sandwiched between the slurry tank 1020 and the second micro-channel heat exchanger 1320. Cooled water 1190 may flow through the second micro-channel heat exchanger 1320 to provide extra cooling capacity to chill the ingredients flowing therethrough. The second micro-channel heat exchanger 1320 may be arranged in parallel or in cross flow to the first micro-channel heat exchanger 1310. Other components and other configurations also may be used herein.

Figure 11:
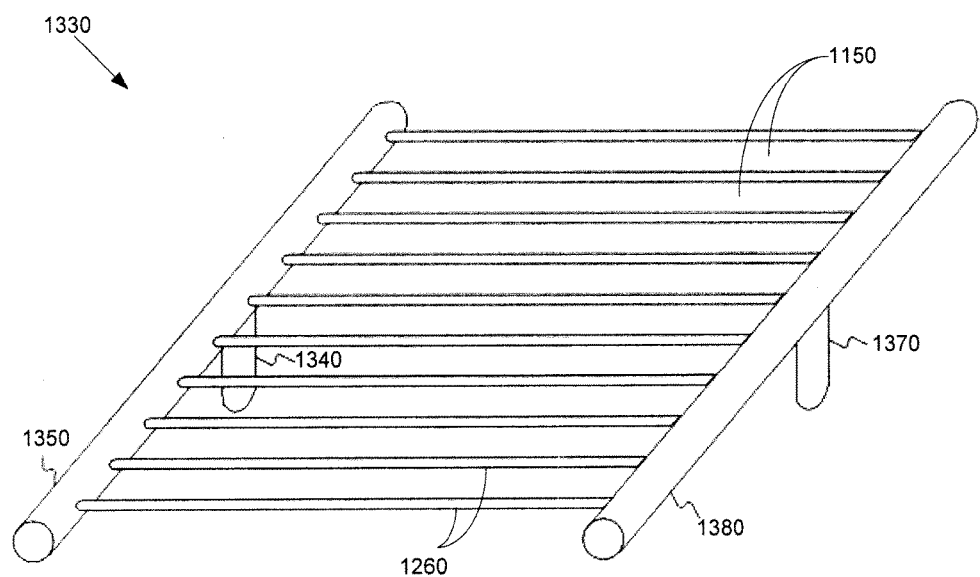
FIG. 11 is a schematic diagram of an alternative embodiment of a potable water/ice slurry refrigeration system as may be described herein.

FIG. 11 shows an example of a grate 1330 that may be used as a prechiller. The grate 1330 may include an inlet 1340 connected to an inlet manifold 1350. The inlet manifold 1350 may disperse the fluid to various tubing 1260 that may deliver the fluid to an outlet manifold 1360. From the outlet manifold 1360, the fluid may flow to an outlet 1370. The grate 1330 may have any size, shape, or configuration. Other components and other configurations also may be used herein.

Figure 12:
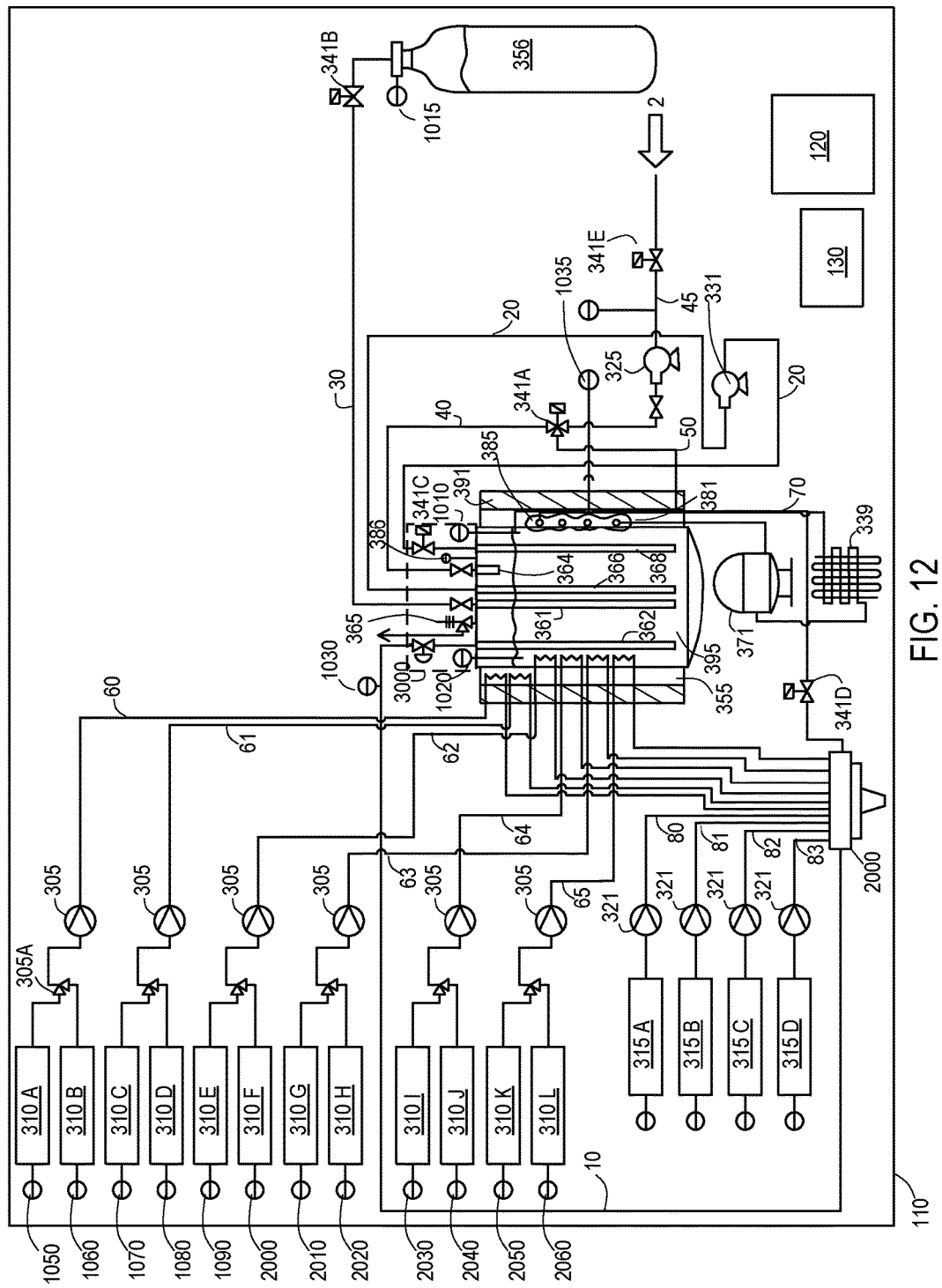
FIG. 12 is a block diagram of an operating system for dispensing multiple flavored brands as is described herein.

FIG. 12 is a schematic view of an operating system 1201 for dispensing multiple flavored brands consistent with embodiments of the disclosure. As shown in FIG. 12, the components of the operating system 1201 may be positioned within a housing 110. The operating system 1201 may include a dispensing apparatus. The housing 110 may be made out of thermoplastics, metals, combinations thereof, and the like. The housing 110 may include a controller 120 for overall operations and communications. The controller 120 may be any type of programmable processing device and the like. The controller 120 may be positioned within the housing 110 or the controller 120 may be external thereof. Multiple controllers 120 may also be used. A consumer may select a beverage via a consumer input device 130 positioned on the housing 110 or external thereof. The input device 130 is described in greater detail below in FIG. 13.

The operating system 1201 may include a number of beverage cartridges positioned within the housing 110. The beverage cartridges may contain beverage concentrates that relate to the beverages described above. In an exemplary embodiment, a plurality of beverage cartridges may house beverage concentrates 310A-L. In some embodiments, the beverages concentrates may include the sweetener for the beverages and have reconstitution ratios of 3:1-6:1. In some cases, the beverage concentrates may be high yield concentrates with reconstitution ratios greater than 6:1, but less than 10:1, such as 8:1. Any number of cartridges and beverage concentrates may be used herein. Each of the beverage cartridges may be in communication with a concentration pump 305. The concentration pumps 305 may be of conventional design and may be a positive displacement pump, a piston pump, and the like. Likewise the operating system 1201 may also include a plurality of flavor cartridges. The flavor cartridges may house flavors 315A-D. In some embodiments, the flavors may be micro-ingredient flavor concentrates with reconstitution ratios of 10:1 or higher, such as 20:1, 50:1, 100:1, 150:1, 300:1, or higher. Any number of flavor cartridges may be used herein. Each of the flavor cartridges may be in communication with a flavor pump 321. The flavor pumps 321 may be of conventional design and may be a positive displacement pump and the like. The positive displacement pump may be a solenoid pump, a gear pump, an annular pump, a peristaltic pump, a syringe pump, a piezo pump or any other type of positive displacement device that is designed to pump a fixed displacement for each pump cycle.

The operating system 1201 also may include a dispensing nozzle 200. In some embodiments, the dispensing nozzle 2000 may be embodied as described. The dispensing nozzle 2000 may mix the streams of beverage concentrates 310A-L and flavors 315A-D. The dispensing nozzle 2000 may be of conventional design. The dispensing nozzle 2000 may mix the fluid streams via a target or via air mixing and the like. Other components and other configurations may be used herein.

The beverage concentrates and flavors may be convention single brand concentrates or flavor concentrates. A number of beverage concentrates and flavors may be available to produce a number of standard core beverages, flavor modified beverages, or blended beverages. The beverage concentrates and flavors may have varying levels of concentration. Alternatively, the beverage concentrates and/or flavors may be separated in macro-ingredients and micro-ingredients. Generally described, the macro-ingredients may have reconstitution ratios in the range of about 3:1 to about 6:1. The viscosities of the macro-ingredients typically range from about 100 centipoise or higher. Macro-ingredients may include sugar syrup, HFCS (High Fructose Corn Syrup), beverage base concentrates, juice concentrates, and similar types of fluids.

The micro-ingredients may have a reconstitution ratio ranging from about ten to one (10:1), twenty to one (20:1), thirty to one (30:1), or higher. Specifically, many micro-ingredients may be in the range of fifty to one (50:1) to three hundred to one (300:1). The viscosities of the micro-ingredients typically range from about 1 to about 100 centipoise or so. Examples of micro-ingredients include natural and artificial flavors; flavor additives; natural and artificial colors; artificial sweeteners (high potency or otherwise); additives for controlling tartness, e.g., citric acid, potassium citrate; functional additives such as vitamins, minerals, herbal extracts; nutraceuticals; and over-the-counter (or otherwise) medicines such as acetaminophen and similar types of materials. The acid and non-acid components of non-sweetened beverage baser component concentrates also may be separated and stored individually. The micro-ingredients may be liquid, powder (solid), or gaseous form and/or combinations thereof.

The operating system 1201 may also include a carbon dioxide source 356 positioned within the housing 110. The carbon dioxide source 356 may be a carbon dioxide tank and the like. The carbon dioxide source 356 may have any size, shape, or configuration. Multiple carbon dioxide tanks may be used. An external carbon dioxide source 356 may also be used. A tank sensor 1015 may be used to detect the presence of the carbon dioxide source 356 within the housing 110. The tank sensor 1015 may be of conventional design and may be in communication with the controller 120. A pressure regulator 341B may be used with or downstream of the carbon dioxide source 356. The pressure regulator 341B may be of conventional design.

Figure 15:
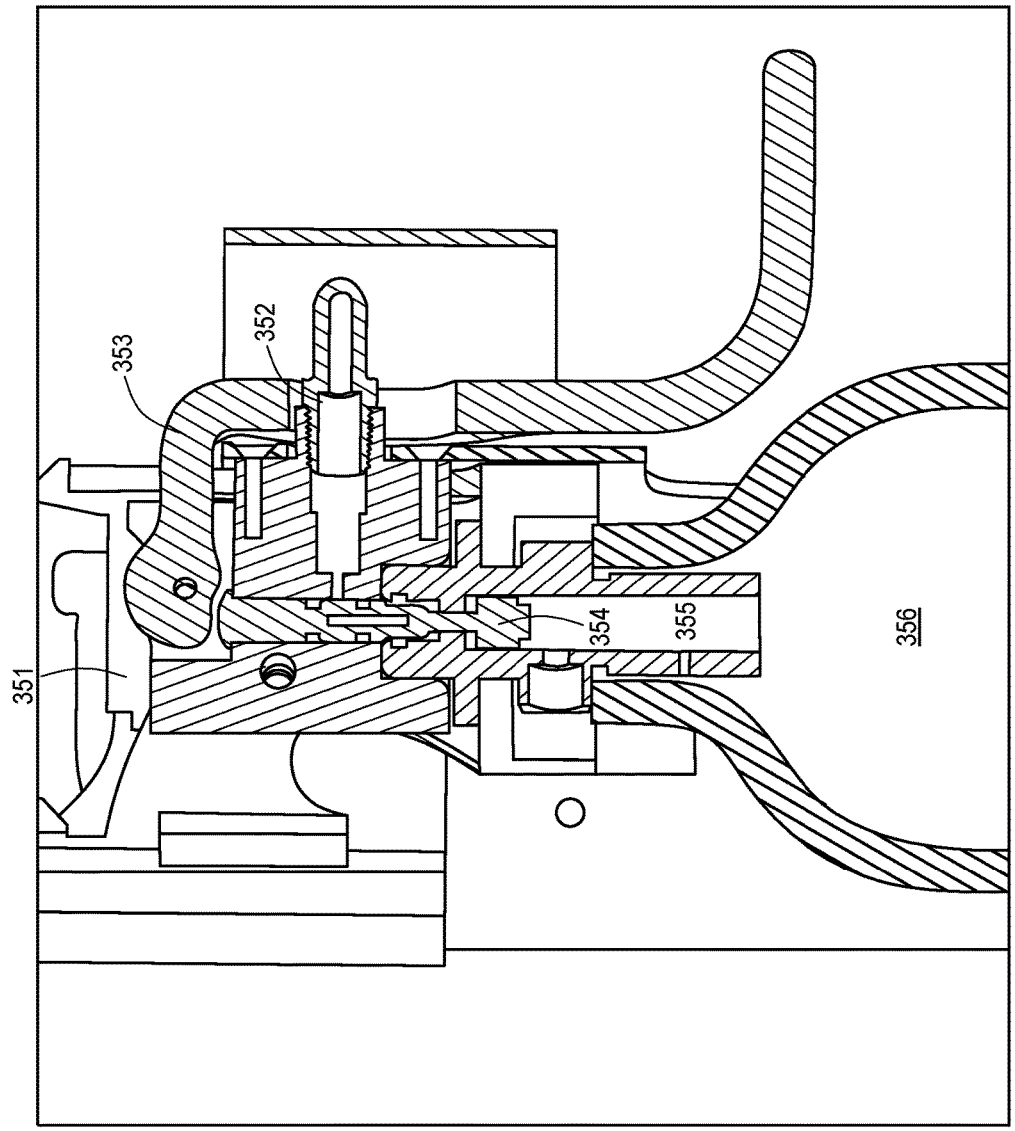
FIG. 15 is a carbon dioxide system in accordance with the present disclosure.

As shown in FIG. 15, the carbon dioxide source 356 may be introduced into the housing 110 utilizing a quick connect mechanism 351. To prevent over pressure within the operating system 1201, the carbon dioxide source 356 may include a pressure regulator 341B to detect pressure received from the carbon dioxide source 356. In one example, the pressure regulator 341B may be in communication with the controller 120. In addition to or as an alternative to the pressure regulator 341B, the carbon dioxide source 356 may employ a throttling system 352 within the quick connect mechanism 351 to prevent over pressure within the operating system 1201. In the depicted example, the quick connect mechanism 351 is shown and described for a carbon dioxide source 356 with a vertical outlet. In an alternative embodiment, the quick connect mechanism 351 may be used for a carbon dioxide source 356 embodying a right-angled outlet. In other examples, the quick connect mechanism 351 may be used for carbon dioxide sources that may otherwise have outlets that are not vertical.

To initiate flow from the carbon dioxide source 356, the controller 120 may be in communication with a lever 353 within the quick connect mechanism 351 to press a release pin 354 down within the carbon dioxide source 356 to provide an opening 355. The controller 120 may communicate to the lever 353 via a solenoid switch or any other electromechanical devices known in the art. The release pin 354 may include a schrader valve. The opening 355 may enable carbon dioxide gas to flow to downstream via the throttling system 352. In certain examples, the throttling system 352 may be constructed to restrict the flow rate of the gas coming out of the carbon dioxide source 356 under high pressure to a reduced flow rate once the release pin 354 is pressed within the carbon dioxide source 356. The throttling system 352 may provide a restriction to the gas flow rate to control the gas flow rate and prevent over pressure within the operating system 1201. The throttling system 352 may include a piston, a metal disk with a predetermined orifice, a butterfly valve, or any other electromechanical obstructions known in the art.

The operating system 1201 may also include refrigerated carbonator 360 positioned within the housing 110. The refrigerated carbonator 360 may include a tank head 3000. The refrigerated carbonator 360 may receive carbon dioxide at the tank head 3000 from the carbon dioxide source 356 via the pressure regulator 341B. The carbon dioxide regulator 341B and/or the throttling system 352 may be in communication with a stinger tube 361. The stinger tube 361 may extend into the refrigerated carbonator 360 towards a bottom end thereof. A pressure relief valve 365 may be positioned on the refrigerated carbonator 360. The pressure relief valve 365 may be of conventional design. Other components and other configurations may be used herein.

The refrigerated carbonator 360 may include an outer insulating jacket 391, a plain water reservoir 355 concentric within the outer insulating jacket 391, and a carbonated water reservoir 395 concentric within the plain water reservoir 355. The outer insulating jacket 391 may be partially cylindrical in shape and may have any length or diameter. The outer insulating jacket 391 may be made from an outer layer of an acrylic or similar types of materials and inner layer of an insulating material with good thermal insulating characteristics. Other types of materials may be used herein. The refrigerated carbonator 360 may include a carbonated water carbonated water recirculation loop 20. The carbonated water recirculation loop 20 may extend from a recirculation dip tube 367 at the tank head 3000 that draws carbonated water from the bottom of the carbonator 360, to recirculation regulator 341C, to recirculation pump 331, and back through a water inlet dip tube 366. The water inlet dip tube 366 may include a nozzle configured to add velocity to the water for increased agitation therein. The water inlet dip tube 366 may have an area of narrowing diameter and the like. Furthermore, the water inlet dip tube 366 may have one or more holes along the length of the water inlet dip tube 366 and angled with respect to the inside surface of the carbonated water reservoir 395 to promote circulation of the carbonated water across an ice bank 385 within the carbonated water reservoir 395. Ensuring sufficient circulation may prevent the ice bank 385 from forming non-uniformly throughout the carbonated water reservoir 395. The recirculation regulator 341C may be of conventional design. Alternatively, any type of flow control device may be used herein. The carbonated water recirculation loop 20 may promote good carbon dioxide saturation in the water and heat exchange with the ice bank 385 in the carbonated water reservoir 395.

The carbonated water reservoir 395 may be positioned within the outer insulating jacket 391 and may define a plain water reservoir 355 there between. The carbonated water reservoir 395 may have any length or diameter. The carbonated water reservoir 395 may be made out of metals and other types of materials with good thermal transmittance characteristics. Likewise, the plain water reservoir 355 may have any length, diameter, or volume. The carbonated water reservoir 395 may be a pressurized tank for mixing water and carbon dioxide therein. The plain water reservoir 355 may surround the carbonated water reservoir 395. The plain water reservoir 355 may be in communication with a water inlet 2 via a water input 50, three-way valve 341A, and fill pump 325. The fill pump 325 may of conventional design. The water inlet 2 may be supplied from municipal water. Conversely, the water inlet 2 may be supplied from a water reservoir external to the housing 110. The water input 50 may extend through the outer insulating jacket 391 to the bottom of the plain water reservoir 355. Furthermore, the water input 50 may have an angled hole to promote circulation of the water within the plain water reservoir 355. Ensuring sufficient circulation may prevent the ice bank 385 from forming non-uniformly in the plain water reservoir 355. The water input 50 may be located at, or near the bottom of the plain water reservoir 355, opposite a water output 70, to promote sufficient heat exchange between the plain water and the ice bank 385 within the plain water reservoir 355.

The water output 70 may be located near the top of the plain water reservoir 355. In an alternative embodiment, the water output 70 may be located on the opposite side of the plain water reservoir 355 as the water input 50 to further promote sufficient heat exchange between the plain water and the ice bank 385. Where the water output 70 is located on the opposite side of the plain water reservoir 355, the water may have to flow around the carbonated water reservoir 395 and across the ice bank 385 to reach the outlet 70. The water output 70 may extend from the plain water reservoir 355 to a dispenser 2000 via the output regulator 341D. The output regulator 341D may be of conventional design. Alternatively, any type of flow control device may be used herein.

The refrigerated carbonator 360 may also include a water input 364 at the tank head 3000 for supplying plain water to the carbonated water reservoir 395. The water input 364 may be in communication with the water inlet 2 via a water input 40, three-way valve 341A, and fill pump 325. The water input 364 may extend through the refrigerated carbonator 360 into the carbonated water reservoir 395. The water input 364 may include a water nozzle configured to add velocity to the water for increased agitation therein. The water input 364 may have an area of narrowing diameter and the like. Other components and other configurations may be used herein.

The refrigerated carbonator 360 may include a number of concentrate coils positioned within the plain water reservoir 355 and carbonated water reservoir 395 to chill the beverage concentrate therein. The concentrate coils may have any size, shape, or configuration. A first concentrate coil 60 may be in communication with the beverage concentrates 310A and B to chill the beverage concentrates 310A and B, a second concentrate coil 61 may be in communication with the beverage concentrates 310C and D to chill the beverage concentrates 310C and D, a third concentrate coil 62 may be in communication with the beverage concentrates 310E and F to chill the beverage concentrates 310E and F, a fourth concentrate coil 63 may be in communication with the beverage concentrates 310G and H to chill the beverage concentrates 310G and H, a fifth concentrate coil 64 may be in communication with the beverage concentrates 310I and J to chill the beverage concentrates 310I and J, and a sixth concentrate coil 65 may be in communication with the beverage concentrates 310K and L to chill the beverage concentrates 310K and L. The beverage concentrates may be paired. For example, 310A and 310B may be the same brand. Any number of concentrate coils may be used herein.

The concentrate coils may extend through the refrigerated carbonator 360 via a number of concentrate ports extending through. The beverage concentrates 310A-L thus may be pumped via the concentrate pumps 305 into the refrigerated carbonator 360 so as to be chilled within the concentrate coils 60, 61, 62, 63, 64, 65, and then onto the dispensing nozzle 200. A plurality of concentrate coils may extend into the carbonated water reservoir 395, whereas the remaining concentrate coils may extend into the plain water reservoir 355. As shown in FIG. 1, concentrate coils 60 and 61 extend into the plain water reservoir 355, whereas concentrate coils 62, 63, 64, and 65 extend into the carbonated water reservoir 395. Other components and other configurations also may be used herein.

The refrigerated carbonator 360 may include a refrigeration unit for maintaining an appropriate temperature to develop an ice bank 385 that extends into both the carbonated water reservoir 395 and the plain water reservoir 355. The refrigeration unit may include a compressor 371, a condenser 339, and an evaporator unit 381. The evaporation coils of the evaporator unit 381 may be positioned within the plain water reservoir 355 about the carbonated water reservoir 395. The evaporator unit 381 may have any size, shape, or configuration. Other types of cooling devices may also be used herein. The ice bank 385 may have an ice bank maximum-minimum level sensor 1035. Upon receiving an indication of a maximum fill level from the ice bank maximum-minimum level sensor 1035, the controller 120 may turn off the compressor 371. Likewise, upon receiving an indication of a minimum fill level from the ice bank maximum-minimum level sensor 1035, the controller 120 may turn on the compressor 371.

The refrigerated carbonator 360 may also include a temperature sensor 1010, a level sensor 1020, a tank pressure sensor 386, and other types of sensors located at the tank head 3000. The level sensor 1020 may be configured to detect the maximum carbonator water fill level within the carbonated water reservoir 395. The tank pressure sensor 386 may be configured to detect the maximum carbonator pressure fill level within the carbonated water reservoir 395. In operation, after a beverage has been dispensed or it is otherwise determined that the carbonated water needs to be replenished, the three-way valve 341A may be switched so as to direct plain water from the plain water inlet 2 to water input 40 and into the carbonated water reservoir 395 via the water input 364 until the level sensor 1020 detects that the water level has reached the maximum fill level. A flow meter 103 may be used on the carbonated water line 10 and elsewhere. The sensors 1010, 1020 and the flow meter 1030 may be of conventional design. The sensors 1010, 1020 and the flow meter 1030 may be in communication with the controller 120. Other components and other configurations may be used herein.

In use, the beverage concentrates 310A-L and the flavors 315A-D may be positioned within the housing 110. Likewise, the carbon dioxide source 356 may be positioned within the housing 110. The fill pump 325 may fill the plain water reservoir 355 and the carbonated water reservoir 395 of the refrigerated carbonator 360 with water while the recirculation pump 331 starts to circulate carbonated water through the carbonated water reservoir 395 via the carbonated water recirculation loop 20. Likewise, the refrigerated carbonator 360 therein may be further chilled via the refrigeration unit, which includes a compressor 371, a condenser 339, and an evaporator unit 381.

Once the contents within the carbonated water reservoir 395 and recirculation pump 331 have reached a predetermined temperature as detected by the temperature sensor 1010, the operating system 1201 may allow a consumer to select a beverage via the consumer input device 130. Where at least one of the beverage concentrates 310A-L and the flavors 315A-D have been exhausted, sensors 1050, 1060, 1070, 1080, 1090, 2000, 2010, 2020, 2030, 2040, 2050, and 2060 may detect a no or low flow condition. The sensors may communicate a corresponding signal to the control device 120 when a no or low flow condition is detected. Alternatively, the beverage concentrates 310A-L and flavors 315A-D may be determined to have been exhausted by the control device 120 calculating the number of pulses that the pumps 305 have been cycled. Where an individual beverage concentrate or flavor has been exhausted the control device 120 may switch to a corresponding remaining beverage concentrate. For example, the control device 120 may determine that the beverage concentrate 310A has been exhausted based on the input from sensor 1050 or based on the pump pulse count. The beverage concentrate 310B may then be used in place of beverage concentrate 310A via a bank switching mechanism. This may enable a selected beverage to still be available prior to replacing the exhausted beverage concentrate. The control device 120 may generate an indication that a beverage concentrate has been exhausted. For example, upon the control device 120 determining that a beverage has been exhausted, the control device 120 can output a signal to a user, for instance via the user interface such as 130.

Figure 13:
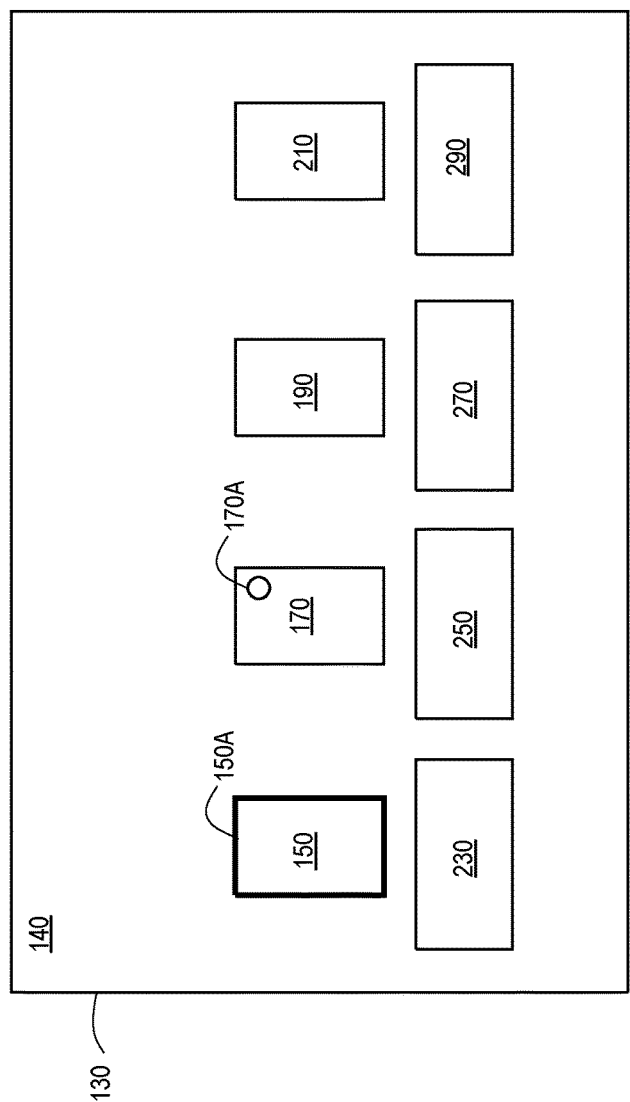
FIG. 13 is a schematic view of a user interface as is described herein.

FIG. 13 is a schematic view of a user interface 130. The input device 130 may be a conventional touchscreen 140 or a similar type of user input device. Alternatively, mechanical devices, electro-mechanical device, audio devices, optical devices, and the like also may be used herein. In this example, the touchscreen 140 may have a number of icons representing a number of beverages and a number of flavors. A first beverage icon 150 may represent a first beverage, a second beverage icon 170 may represent a second beverage, a third beverage icon 190 may represent a third beverage, and a fourth beverage icon 210 may represent a fourth beverage. Any number of beverage icons and beverages may be used herein. The touchscreen 140 may also include a number of flavor icons representing a number of flavors. A first flavor icon 230 may represent a first flavor, a second flavor icon 250 may represent a second flavor, a third flavor icon 270 may represent a third flavor, and a fourth flavor icon 290 may represent a fourth flavor. Any number of flavor icons and flavors may be used herein. Furthermore, the beverage icons may appear on a different page than the flavor icons.

Where an individual beverage concentrate or flavor has been exhausted the control device 120 may switch to a corresponding remaining beverage concentrate. For example, sensor 1050 may detect a no or low flow condition in the beverage concentrate 310A. Alternatively, the control device 120 may determine that the concentrate pump 305 has been pulsed a maximum number of times for beverage 3104A. The beverage concentrate 310B may then be used in place of beverage concentrate 310A. Upon receipt of an indication from the control device 120 that a concentrate has been exhausted within the beverage concentrates 310A-L or flavors 315A-D, the control device 120 can output a signal to a user via the user interface 130. The user interface 130 may indicate sold out or exhausted concentrate condition by highlighting 150A the corresponding icon, providing a small indication 170A over the corresponding icon, or other visual indicators in association with a sold-out brand or flavor on the user interface. A small indication 170A may include an illuminated dot, triangle, or other smaller shapes that do not encompass an entire beverage or flavor icon. Where the corresponding beverage concentrate or flavor has been replenished, a sensor may detect a replenished beverage concentrate or flavor. Subsequently, the control device 120 may remove the signal to a user via the user interface 130. The sold-out indication on the user interface may enable a crewmember, a crew manager, a retail operator, manager, or a service technician to quickly identify which brands that may need to be replaced. This may be particularly useful during a period of high volume users in a short period of time, such as prior to a lunch rush.

Figure 14:
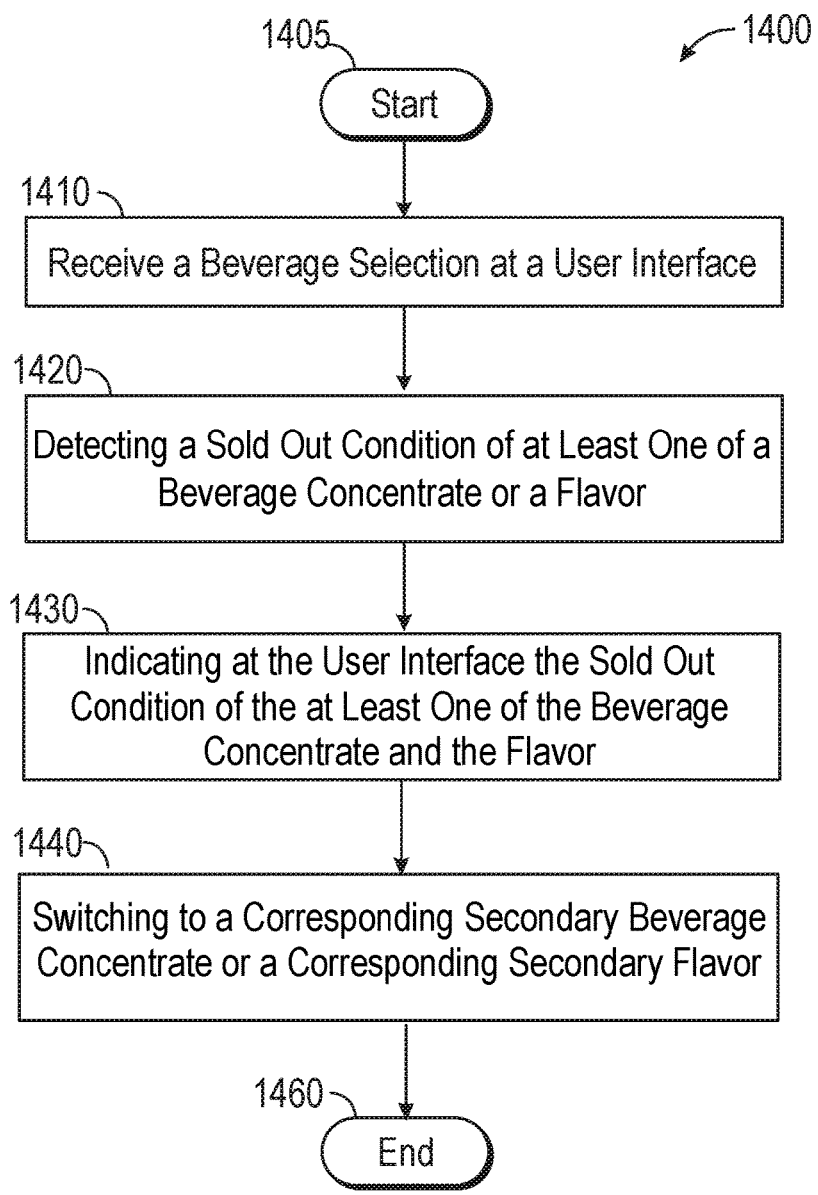
FIG. 14 is a flow chart of a method for dispensing multiple flavored brands as is described herein.

FIG. 14 is a flow chart setting forth the general stages involved in a method 1400 consistent with an embodiment of the disclosure for dispensing multiple flavored brands. Method 1400 may be implemented using an operating system 1201 positioned within a housing 110 as is described in more detail above with respect to FIG. 12-13. Ways to implement the stages of method 1400 will be described in greater detail below.

Method 1400 may begin at starting block 1405 and proceed to stage 310 where a refrigerated carbonator 360 may receive a beverage selection at the user interface 130. For example, the user may select between an assortment of beverages by touching a first beverage icon 150, second beverage icon 170, a third beverage icon 190, a fourth beverage icon 210. Any number of beverage icons of beverages may be used herein. For instance, the user may scroll by sliding his or her finger across the display and make selections by tapping the desired icon.

A second user input may be received at the user interface 130. For example, after selecting the desired core brand the user may be presented with a menu for various flavors of that core brand. For example, the user may select between an assortment of flavors by touching a first flavor icon 230, second flavor icon 250, a third flavor icon 270, a fourth flavor icon 290. Any number of flavor icons of flavors may be used herein. For example, if the user selects Coca-Cola®, then a second menu may appear displaying Coca-Cola®, Vanilla Coke®, Cherry Coke®, and the like. Third user input for dispensing a beverage may include a pour button on touchscreen, lever, push-to-pour button, or other mechanical or electrical input separate from the touchscreen.

Method 1400 may continue to stage 1420 where a sold out condition of at least one beverage concentrate or flavor may be detected. Upon receipt of an indication from the control device 120 that a sold out condition exists within the beverage concentrates 310A-L or flavors 315A-D, the control device 120 can output a signal to a user via the user interface 130. The sold-out indication on the user interface 130 may enable a crewmember, a crew manager, a retail operator, manager, or a service technician to quickly identify which brands or flavors that may need to be replaced.

Method 1400 may continue to stage 1430 where the user interface 130 may indicate a sold out condition of the at least one of the beverage concentrate or the flavor. The indication may be accomplished by highlighting 150A the specific icon, providing a small indication 170A over the specific icon, or other visual indicators in association with a sold-out brand or flavor on the user interface. A small indication may include an illuminated dot, triangle, or other smaller shapes that do not encompass an entire beverage or flavor icon. Where the specific beverage concentrate has been replenished, a sensor may detect a replenished beverage concentrate or flavor. Subsequently, the control device 120 may remove the signal sent to a user via the user interface 130.

Furthermore, upon detecting an individual beverage concentrate or flavor has been exhausted a control device 120 may switch to a corresponding secondary beverage concentrate or a corresponding secondary flavor in stage 1440. For example, sensor 1050 may detect a sold out condition in the beverage concentrate 310A. The beverage concentrate 310B may be used in place of beverage concentrate 310A via a bank switching mechanism. This may enable a selected beverage to still be available prior to replacing the exhausted beverage concentrate.

In one example, carbonated water and still water can be controlled such that a variety of beverages having different carbonation levels may be dispensed.

Figure 16:
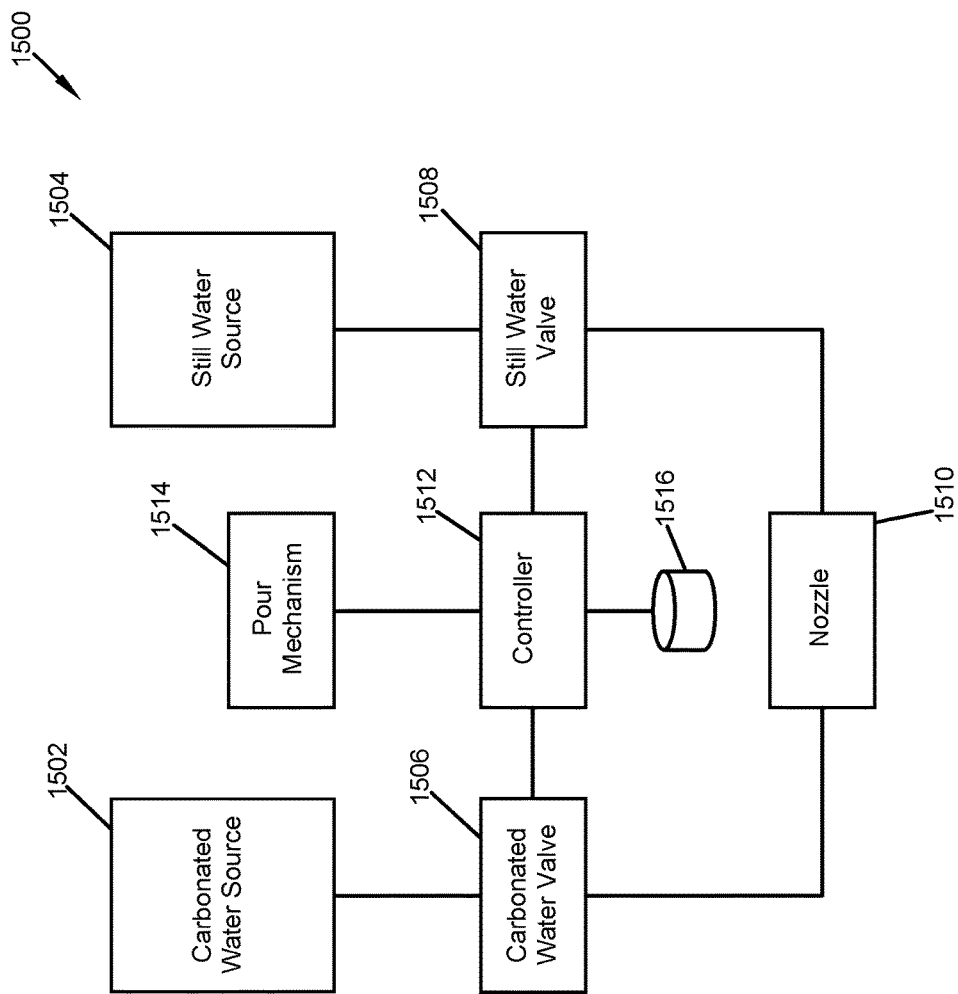
FIG. 16 is a block diagram of an alternative embodiment of a dispenser system.

For instance, referring to FIG. 16, an example of a beverage dispenser 1500 for providing variable carbonation is illustrated. In this example, FIG. 16 may be a higher-level rendition of FIG. 1 or FIG. 12. It is to be understood that FIG. 12 is another example beverage dispenser that can provide a system for implementing the variable carbonation levels described herein. The beverage dispenser 1500 may include a carbonated water source 1502 and a still water source 1504. The beverage dispenser 1500 may include a carbonated water valve 1506 and a still water valve 1508 to control the flow of carbonated water and still water respectively through the beverage dispenser 1500. The carbonated water and the still water may be supplied to a nozzle 1510 for use in pouring carbonated water and still water from the beverage dispenser 1500. In some embodiments, the carbonated water and still water may connect to the nozzle 1510 via a T joint or other such connection mechanism such that both carbonated water and still water may be provided to a diluent port of the nozzle 1510. In such embodiments, the nozzle 1510 may be embodied as described in U.S. Pat. No. 7,866,509, herein incorporated by reference in its entirety. Similarly, the nozzle 1510 may be embodied as described in co-pending application titled "Common Dispensing Nozzle," Ser. No. 14/265,632. In other embodiments, the nozzle 1510 may have separate carbonated water and still water input ports. One of ordinary skill in the art will recognize that the beverage dispenser 1500 may include one or more pumps, valves, flow control devices, or other devices to control the flow of fluids through the beverage dispenser 1500.

In one example, the beverage dispenser 1500 may include a controller 1512 for overall operations and communications. The controller 1512 may be any type of programmable processing device and the like. Multiple controllers 1512 may also be used. Under the controller 1512, the carbonated water valve 1506 and the still water valve 1508 may be operated to dispense the precise volume of carbonated water and still water to dispense a desired beverage. The controller 1512 can receive an input to pour a beverage from a pour mechanism 1514. The pour mechanism 1514 may be a button, lever, touch screen icon, or any other mechanism for instructing a beverage to be dispensed. The input from the pour mechanism 1514 may be represented as the "pour" waveform in FIGS. 17-22 below.

In some examples, the controller 1512 may be operationally related to a database 1516 that includes beverage recipes, formulations, and methods of making beverages. Such beverage recipes, formulations, and methods of making beverages may include an ingredient list, the ratio of each ingredient, a listing of how a beverage can be customized by a consumer, consumer preferences for dispensing one or more beverages, portion control dispense information associated with one or more beverages and/or other types and kinds of beverage recipes, formulations, and methods of making a beverage as may be required and/or desired. The beverage dispenser 1500 may dispense a vast range of beverage types to form branded beverages such as Coca-Cola®, Vanilla Coke®, Cherry Coke®, or Fanta™ beverages, as well as a vast range of other branded beverages, non-branded beverages, and/or consumer customized beverages.

A variety of branded beverages can be dispensed from the nozzle 1510 irrespective of the differing carbonation levels that can be found in brand recipes. The controller 1512 can control the carbonated water valve 1506 and the still water valve 1508 to produce variability in carbonation levels of dispensed beverages. For example, the controller 1512 can be used to control a desired volume of carbonated water from the carbonated water source 1502 by varying the control signals for opening and closing the carbonated water valve 1506. Likewise, the controller 1512 can be used to control a desired volume of still water from the still water source 1504 by varying the control signals for opening and closing the still water valve 1508. By electronically controlling the volume of carbonated water to still water, the ratio of carbonated water to still water can be varied as desired. The beverage dispenser 1500 provides for continuously adjustable carbonation levels via electronic settings from 0% carbonation to 100% carbonation. Various ways for controlling the ratios of carbonated water to still water will be described in more detail with reference to FIGS. 17-22.

A number of recipes can be generated to specify a variety of carbonated water to still water ratios for dispensed beverages. In one example, different brand recipes can be preprogrammed into the database 1516 upon which the controller 1512 obtains the recipes from either memory associated with the controller and/or from a remote data processing resource (e.g., server) to dispense a beverage by way of the nozzle 1510. In other examples, the recipes can be altered or customized by a customer, consumer, or end user who may make a beverage type selection based on a variety of carbonated water to still water ratios. The user may make the beverage type selection using a suitable input device associated with the controller 1512, such as a user interface. In some examples, a technician or maintenance crew may adjust the carbonation levels up or down to vary the ratio of still water to carbonated water for a given recipe. The technician may use another input device or maintenance screen associated with the controller 1512 to make adjustments. This type of calibration or fine tuning of the recipe values can be completed according to the customers' or end users' liking through another input device associated with the controller 1512.

FIGS. 17-21 illustrate various control signals that can be used to vary the carbonated water to still water ratios.

The method of adjusting the carbonation level is accomplished by way of modulating the still water valves 1508 and the carbonated water valves 1506 to achieve a desired ratio delivery of carbonated to non-carbonated water. The method allows for the realization of mid-carbonated drinks having carbonation levels that differ from other recipes. The method provides for a variety of brand beverages that may be dispensed. Several specifications or recipes including various carbonation levels can be made available providing such variety. The method can enable varying the carbonation ratios without adding components.

Referring to FIG. 17, an example method of controlling the dispense of carbonated water from the carbonated water valve 1506 and still water from the still water valve 1508 is shown. The method illustrates a period $T_1$ over which a full one cycle occurs for adjusting the carbonation level during which the still water and carbonated water valves 1506, 1508 are adjusted. The method allows for the continuous adjustment of carbonation levels using an electronic setting from zero to 100 percent of available carbonation. For example, full carbonated water (e.g., no still water) would be about 100 percent carbonated water, and full still water (e.g., no carbonated water) of would be about zero percent carbonated water. It is to be understood that the ratio of still water to carbonated water can be anywhere between zero to 100 percent. The ratio of carbonated water to still water can be accomplished by modulating the still water and carbonated water valves 1506, 1508 over the period $T_1$.

As shown in FIG. 17, the ratio of carbonated water to still water is 1:1 such that there is about a 50/50 (e.g., even mixture) mixture of carbonated water to still water. A mixture of about a 1:1 ratio of carbonated water to still water can be defined as a mid-carbonation mixture. In one example, the carbonated water valve 1506 may be opened for an amount of time $T_2$ followed by the still water valve 1508 being opened for an amount of time $T_3$, where $T_2$ is approximately equal to $T_3$ and the sum of $T_2$ and $T_3$ is equal to $T_1$. In this example, the carbonated water valve 1506 is shut off or closed as the still water valve 1508 is turned on or opened such that both occur at the same time. The period $T_1$ would start and repeat as long as a beverage is being dispensed such that there is a continuous oscillation of carbonated water to still water. Multiple cycles of period $T_1$ may be used for a given pour. Each of the cycles may have the same or a different ratio of carbonated water to still water and the duration of each cycle may be greater than, less than or equal to $T_1$.

In other examples, the method may include a delay period between shutting off of the carbonated water and turning on of the still water and vice versa. The delay can help to achieve a high level of accuracy in the amount of beverage dispensed. In some examples, the method may include an overlap period where the carbonated water valve 1506 and the still water valve 1508 are both opened or turned on for a period of time before one is shut off. See FIG. 17A. In some wave forms, there may not be a delay or overlay period. In such situations, the carbonated water and still water are controlled such that they operate simultaneously. Alternative ways of dividing out the amount of time the carbonated water valve is opened in comparison to the still water valve is described below.

The cycle shown in FIG. 17 can be repeated continuously as the beverage is dispensed. This opening and closing pattern can result in a pulsating delivery of carbonated water and still water. If more carbonation is desired, the ratio of carbonated water to still water can be shifted such that the carbonation water valve 1506 may be opened longer and the still water valve 1508 may be opened shorter where the total opening time for each cycle remains at period $T_1$. For example, the carbonation water valve 1506 may have an opening period of $T_2$ followed by an opening period for the still water valve 1508 of $T_3$, where $T_2$ is greater than $T_3$ and the sum of $T_2$ and $T_3$ is equal to $T_1$. For example, the ratio of $T_2$ to $T_3$ may be about 3:2.

The relative proportion of the carbonated water to still water opening time can be stored as a recipe value in the electronic controller 1512 as described above for each drink the unit is capable of dispensing. This system provides for carbonated beverage to be tailored according to a recipe value stored in conjunction with other drink recipe ingredients (i.e. syrup ratio etc.).

The beverage dispenser 1500 utilizes fixed flow control valves for carbonated water and non-carbonated water to match the flow rate of the carbonated and non-carbonated water to achieve a relative ratio of the carbonated water to non-carbonated water. The beverage dispenser 1500 can dispense a desired ratio of carbonated water to non-carbonated water simply by utilizing the proportions of the values provided in a specific time period. Because the streams are merged downstream of the carbonated water and still water valves 1506, 1508 and before the nozzle 1510, the resultant operation is largely transparent to the customer, consumer, or user who simply receives a beverage at a desired carbonation level. Thus, even if a user provides an input to the beverage dispenser 1500 to stop dispensing (e.g., releases a pour button, lever, etc.) during period $T_1$, the beverage dispenser 1500 will continue to dispense until period $T_1$ is completed to avoid an incorrect ratio of carbonated to still water for a given recipe.

Referring to FIG. 18, another example of a wave form is illustrated. In this example, the ratio of carbonated water to still water is 3:2 such that there is more than about a 50/50 or 1:1 (e.g., more carbonated water than still water) mixture of carbonated water to still water. A mixture of more than a 1:1 ratio of carbonated water to still water can be defined as a moderate-carbonated mixture. The carbonated water valve 1506 may be opened for an amount of time $T_2$ followed by the still water valve 1508 being opened for an amount of time $T_3$, where $T_2$ is greater than $T_3$ and the sum of $T_2$ and $T_3$ is equal to $T_1$. As described above, the relative proportion of the carbonated water to still water opening time can be stored as a recipe value in the electronic controller 1512.

Similar to the wave form described in FIG. 17, it is to be understood that the wave from in FIG. 18 may include a delay period between shutting off of the carbonated water and turning on of the still water and vice versa so as to ensure a high level of accuracy in the amount of beverage dispensed. In other examples, it is possible to have an overlap period where the carbonated water valve 1506 and the still water valve 1508 are both opened (e.g., turned on) for a period of time before one is closed (e.g., turned off). In some wave forms, the carbonated water and still water are controlled such that they operate simultaneously.

Figure 19:
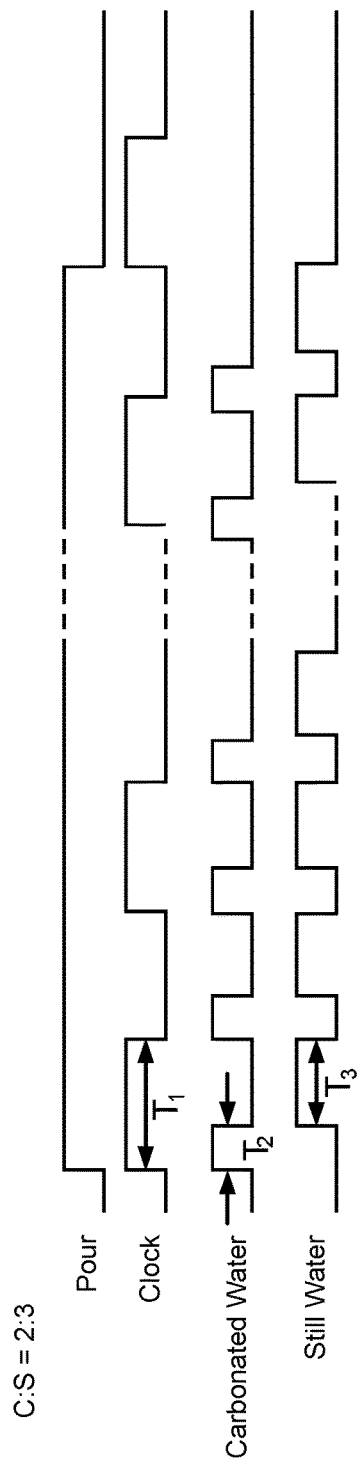
FIG. 19 is another example of a wave form for controlling signals to vary the carbonated water to still water ratios.

Referring to FIG. 19, another example of a wave form is illustrated. In this example, the ratio of carbonated water to still water is 2:3 such that there is less than about a 50/50 or 1:1 (e.g., more still water than carbonated water) mixture of carbonated water to still water. A mixture of less than a 1:1 ratio of carbonated water to still water can be defined as a low-carbonated mixture. The carbonated water valve 1506 may be opened for an amount of time $T_2$ followed by the still water valve 1508 being opened for an amount of time $T_3$, where $T_2$ is less than $T_3$ and the sum of $T_2$ and $T_3$ is equal to $T_1$. As described above, the relative proportion of the carbonated water to still water opening time can be stored as a recipe value in the electronic controller 1512.

Similar to the other wave forms described above, it is to be understood that the wave from in FIG. 19 may include a delay period between shutting off of the carbonated water and turning on of the still water and vice versa so as to ensure a high level of accuracy in the amount of beverage dispensed. In other examples, it is possible to have an overlap period where the carbonated water valve 1506 and the still water valve 1508 are both opened (e.g., turned on) for a period of time before one is closed (e.g., turned off). In some wave forms, the carbonated water and still water are controlled such that they operate simultaneously.

Figure 20:
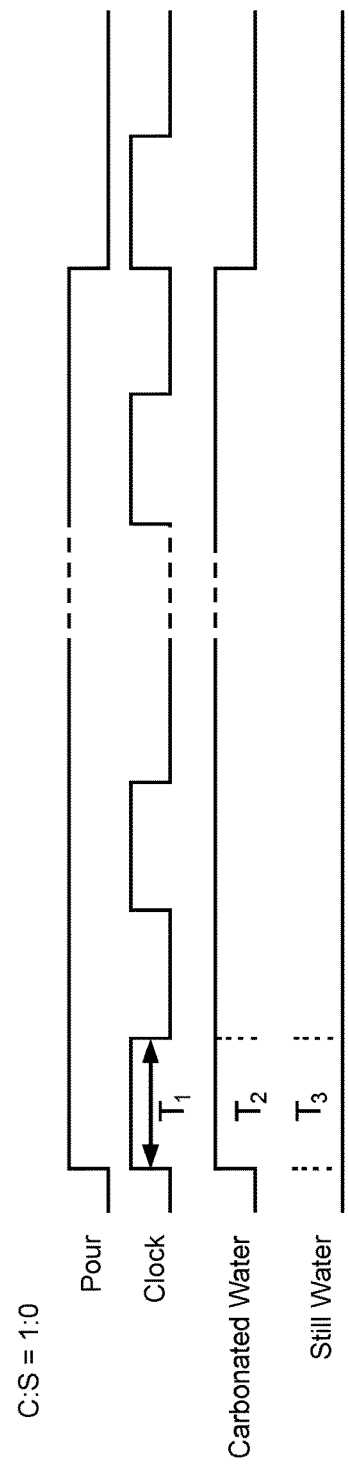
FIG. 20 is another example of a wave form for controlling signals to vary the carbonated water to still water ratios.

Referring to FIG. 20, another example of a wave form is illustrated. In this example, the ratio of carbonated water to still water is 1:0 such that there is about all carbonated water (e.g., full carbonated water). The carbonated water valve 1506 may be opened during the full cycle time where the still water valve 1508 remains closed (e.g., turned off). That is, the carbonated water valve 1506 may be open for a period of time $T_2$ and the still water valve 1508 may remain closed for a period of time $T_3$, where $T_1$, $T_2$, and $T_3$ are all approximately equal. As described above, the relative proportion of the carbonated water opening time can be stored as a recipe value in the electronic controller 1512.

Figure 21:
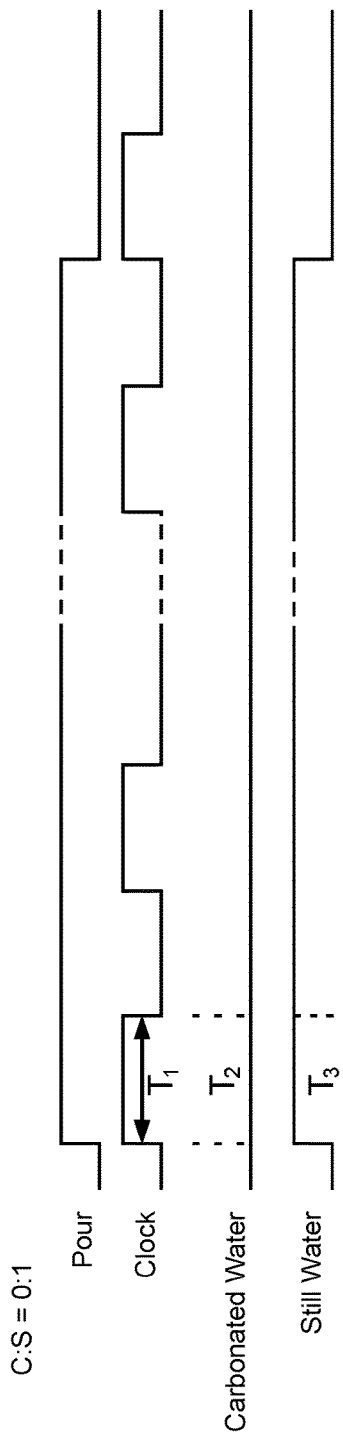
FIG. 21 is another example of a wave form for controlling signals to vary the carbonated water to still water ratios.

Referring to FIG. 21, another example of a wave form is illustrated. In this example, the ratio of carbonated water to still water is 0:1 such that there is about all still water (e.g., non-carbonated). The still water valve 1508 may be opened during the full cycle time where the carbonated water valve 1506 remains closed (e.g., turned off). That is, the carbonated water valve 1506 may be closed for a period of time $T_2$ and the still water valve 1508 may remain open for a period of time $T_3$, where $T_1$, $T_2$, and $T_3$ are all approximately equal. As described above, the relative proportion of the still water opening time can be stored as a recipe value in the electronic controller 1512.

Figure 22:
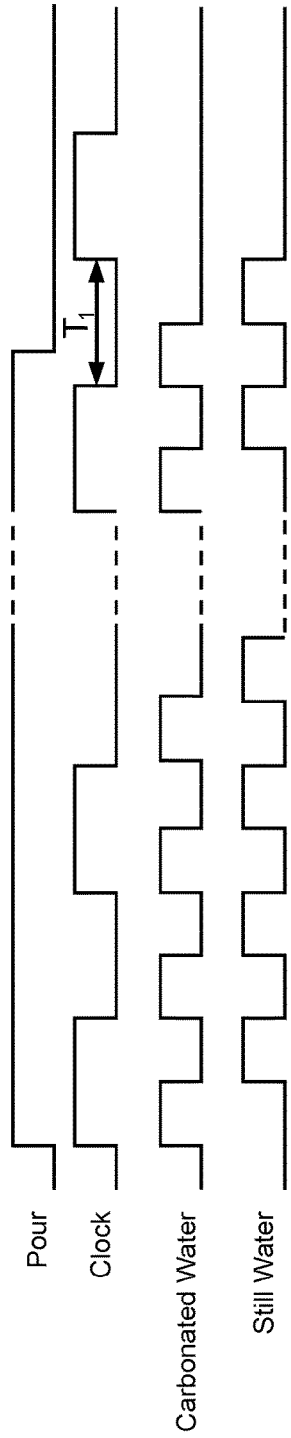
FIG. 22 is another example of a wave form for controlling signals to vary the carbonated water to still water ratios.

Referring to FIG. 22, another example of a wave form is illustrated. In this example, the ratio of carbonated water to still water is 1:1 as shown in FIG. 17. In this example, the pour control input is de-activated in the middle of one of the periods $T_1$. As described above, the pour operation during that period $T_1$ can continue. The pour operation for the next period $T_1$ can be closed (e.g., turned off) to ensure that the correct ratio of carbonated water to still water is obtained. While this example is shown for the mid-carbonation mixture, it should be understood that a similar control operation can be performed for any of the full carbonated, moderate-carbonated, mid-carbonated, low-carbonated, or non-carbonated mixtures.

Figure 23:
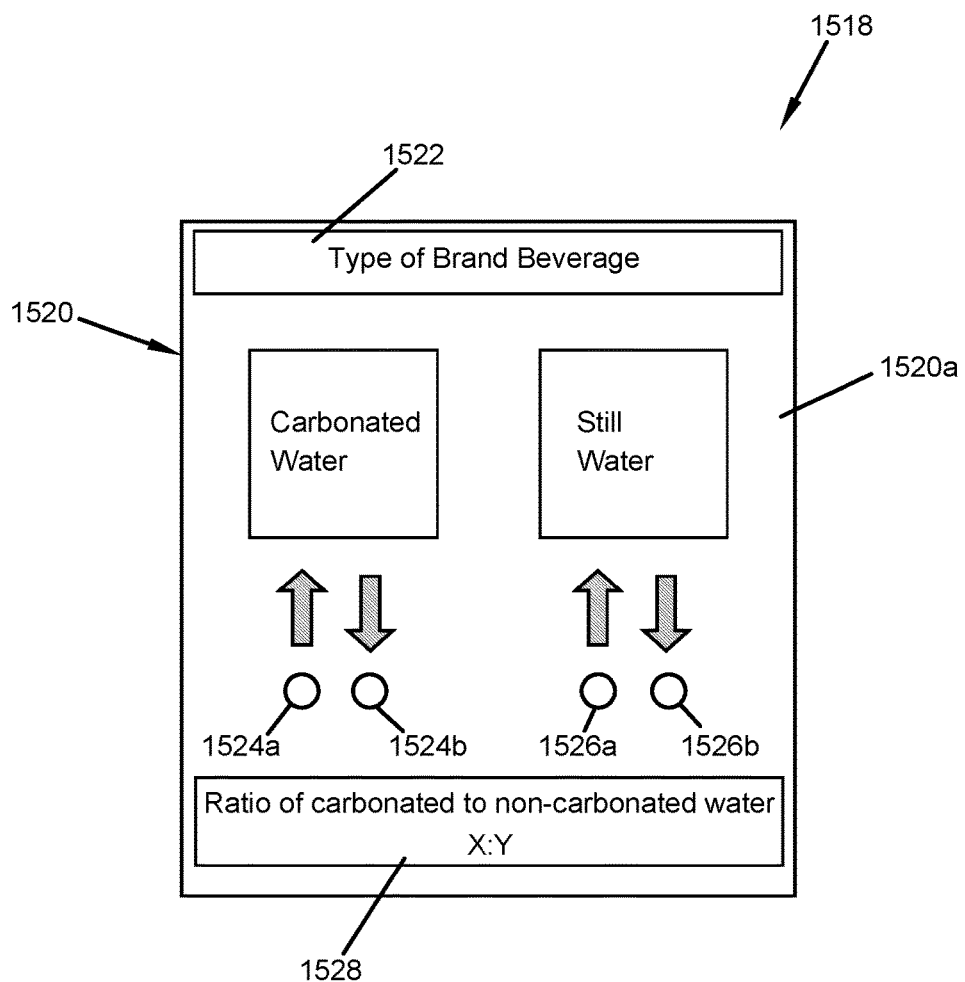
FIG. 23 is a schematic view of another user interface for varying the carbonated water to still water ratios in the example dispenser system shown in FIG. 16.

Referring to FIG. 23, a schematic view of an example input device 1518 (e.g., user interface) for varying the carbonated water to still water ratios is shown. The user interface can be provided on the beverage dispenser 100 or on a separate device, such as a computing device like a laptop, tablet, cellular telephone, etc. The input device 1518 may be a conventional touchscreen 1520 or a similar type of device. The touchscreen 1520 may include a maintenance screen 1520a for controlling the ratio of carbonated to non-carbonated water for a desired brand beverage. In this example, the touchscreen 1520 may have an icon 1522 for selecting a number of brand beverages that may have been preprogrammed in the beverage dispenser 1500. Any number of brand beverages may be used herein. The touchscreen 1520 may also include icons 1524a, 1524b for adjusting up or down the volume of carbonated water in a desired brand beverage. The touchscreen 1520 may also include icons 1526a, 1526b for adjusting up or down the volume of still water in a desired brand beverage. The touchscreen 1520 may include an icon 1528 for indicating the ratio of carbonated to non-carbonated water for a desired beverage as the adjustment of carbonated to non-carbonated water is made.

In other examples, the beverage dispenser 1500 may automatically adjust the carbonation level in a desired beverage based on ingredients contained within the desired beverage. For example, the carbonation level may be automatically set at a maximum carbonation level (e.g., the ratio of carbonated water to still water is 1:0) by the beverage dispenser 1500 if a user selects to dispense a first beverage. However, the carbonation level may be automatically set at a less than maximum carbonation level (e.g., the ratio of carbonated water to still water is 9:1) by the beverage dispenser 1500 if a user selects to dispense a beverage known to cause additional foaming. Because the beverage may cause additional foaming upon being dispensed, it may be desirable to automatically slightly lower the carbonation level of the beverage in order to reduce the amount of foaming experienced in the beverage.

In another example, the carbonation level may be automatically set at a maximum carbonation level (e.g., the ratio of carbonated water to still water is 1:0) by the beverage dispenser 1500 if a user selects to dispense a first beverage. However, the carbonation level may be automatically set at a less than maximum carbonation level (e.g., the ratio of carbonated water to still water is 6:1) by the beverage dispenser 1500 if a user selects to dispense a second beverage. That is, based on the type of beverage selected to be dispensed; a desirable carbonation level for the selected beverage may already be known.

In a further example, a user may select a custom beverage by selecting one or more ingredients to be combined together to dispense the custom beverage. In such examples, the beverage dispenser 1500 may automatically set the carbonation level of the custom beverage based on one or more ingredients that are to be combined together to form the custom beverage. For example, if the custom beverage includes an ingredient known to cause additional foaming, the carbonation level may automatically be set to a less than maximum carbonation level to mitigate against excess foaming (e.g., the ratio of carbonated water to still water is 9:1)

In other examples, the beverage dispenser 1500 may also automatically set the carbonation level of the custom beverage based on the type of beverage to be dispensed. For example, if the custom beverage is primarily a fruit flavored custom beverage, then the carbonation level may automatically be set to a less than maximum carbonation level (e.g., the ratio of carbonated water to still water is 6:1).

It will be understood that the scope of the present disclosure is not limited to the ratios provided in the above mentioned examples and any ratio of carbonated water to still water may be used in any of the above mentioned examples.

While the present disclosure has been described in terms of particular preferred and alternative embodiments, it is not limited to those embodiments. Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

What is claimed is:

1. A method of dispensing beverages of varying carbonation levels from a beverage dispenser, comprising:
   receiving an input to dispense a beverage;
   automatically adjusting a carbonation level associated with the beverage to be dispensed based on one or more ingredients included within the beverage to be dispensed; and
   modulating a carbonated water valve and a still water valve to alternately dispense carbonated water and still water at a ratio over multiple cycles to achieve the carbonation level.

2. The method according to claim 1, further comprising:
   receiving the carbonation level associated with the beverage to be dispensed from a technician through a maintenance screen located within the beverage dispenser.

3. The method according to claim 1, wherein both the carbonated water valve and the still water valve are open at the same time for at least a portion of each cycle.

4. The method according to claim 1, wherein modulating the carbonated water valve and the still water valve comprises shutting off the carbonated water valve as the still water valve is turned on in each cycle such that both occur at the same time.

5. The method according to claim 1, wherein the ratio of carbonated to non-carbonated water is such that there is about a 1:1 ratio of carbonated water to still water.

6. The method according to claim 5, wherein the carbonated water valve is opened for a predetermined period of time followed by the still water valve being opened for the same period of time.

7. The method according to claim 1, wherein the ratio of carbonated to non-carbonated water is such that there is more than about a 1:1 ratio of carbonated water to still water.

8. The method according to claim 7, wherein the carbonated water valve is opened for a predetermined period of time followed by the still water valve being opened for less than the predetermined period of time.

9. The method according to claim 1, wherein the ratio of carbonated to non-carbonated water is such that there is less than about a 1:1 ratio of carbonated water to still water.

10. The method according to claim 9, wherein the carbonated water valve is opened for a predetermined period of time followed by the still water valve being opened for more than the predetermined period of time.

11. The method according to claim 1, further comprising a delay period between each of the multiple cycles.

12. The method according to claim 1, further comprising receiving an input to de-activate a pour during a cycle and continuing the modulating to an end of the cycle such that the ratio is maintained.

13. A dispenser system for providing variable carbonation in a beverage, comprising:
   a carbonated water source in communication with a carbonated water valve for controlling flow of carbonated water through the dispenser system;
   a still water source in communication with a still water valve for controlling flow of still water through the dispenser system;
   a controller including a programmable processing device programmed to:
      adjust a carbonation level associated with a beverage to be dispensed based on one or more ingredients included within the beverage to be dispensed; and
      modulate the carbonated water and still water valves over multiple cycles to achieve the carbonation level for the beverage; and
   a pour mechanism structured to provide an input to the processing device to dispense the beverage.

14. The dispenser system of claim 13, wherein each of the one or more modulate cycles define a period of time that is continuously repeated as long as an input to dispense the beverage is received.

15. The dispenser system of claim 13, wherein the ratio of carbonated to non-carbonated water is such that there is about a 1:1 ratio of carbonated water to still water.

16. The dispenser system of claim 13, further comprising an input device for altering carbonation levels, wherein the input device is located at a user interface.

17. The dispenser system of claim 13, further comprising a connection mechanism for connecting the carbonated water source and still water source to a nozzle such that both carbonated water and still water is provided to a diluent port of the nozzle.

18. The dispenser system of claim 17, wherein the connection mechanism is a t-joint.

* * * * *